United States Patent

Provenzano, Jr. et al.

[15] 3,702,989

[45] Nov. 14, 1972

[54] SELECTIVE DATA HANDLING APPARATUS

[72] Inventors: James Provenzano, Jr., Winsted; John Saunders, East Hartford; Henry Monterose, Wapping, all of Conn.

[73] Assignee: United Aircraft Corporation, East Hartford, Conn.

[22] Filed: March 12, 1971

[21] Appl. No.: 123,854

Related U.S. Application Data

[63] Continuation of Ser. No. 803,372, Feb. 28, 1969, abandoned.

[52] U.S. Cl. ............................................. 340/172.5
[51] Int. Cl. ............................................. G11b 27/00
[58] Field of Search ................................. 340/172.5

[56] References Cited

UNITED STATES PATENTS

| | | | |
|---|---|---|---|
| 3,094,609 | 6/1963 | Weiss | 340/172.5 |
| 3,324,458 | 6/1967 | MacArthur | 340/172.5 |
| 3,430,206 | 2/1969 | Ernyei et al. | 340/172.5 |

OTHER PUBLICATIONS

" Mechanization of a Digital Compressor for Biomedical Data" by G. M. Lob, Wescon 67 technical papers, Aug. 22– 25, 1967, pp. 6/1–6/12.

*Primary Examiner*—Gareth D. Shaw
*Attorney*—Melvin Pearson Williams

[57] ABSTRACT

Raw data relating to a variety of parameters is analyzed to determine whether or not the current value or condition of the parameter is significant according to schedules of criteria which are subject to change. Criteria selection is adaptive, being dependent upon modes or conditions indicated by the parameter values being handled by the apparatus. Additionally, certain criteria may have floating limits, so that the base from which deviation is measured for the purpose of determining significance is adjusted whenever a significant condition (deviation from a base by more than a permissible amount) occurs. Additionally, fixed limits are provided, particularly for parameters of the type that can result in a dangerous condition whenever the value of the parameter exceeds certain upper or lower limits. A given parameter may be tested for both floating limit and fixed limit conformance, and provision is made to take similar as well as different action in dependence upon exceeding the different types of limits. Provision is made to transmit the data, in this embodiment to record it for further analysis at a later date, in dependence upon exceeding a fixed limit a number of times more than a number setable to indicate probable successive number of transients. Exceeding a fixed limit results in printing an identification of the parameter which exceeded a fixed limit together with Greenwich Mean Time at the time of occurrence and an indication of whether an upper or lower limit was exceeded. Thereafter, that parameter will not cause printing until such time as the parameter value again falls within fixed limits.

The disclosure embodiment utilizes standard data processing components in a relatively simple data flow arrangement, will control provided by a parameter identification decode in a read only memory (hereinafter referred to as ROM) or large decoding matrix. The ROM provides for each given parameter: a transient index indicative of the number of probable transients, thereby to be ignored; floating limit deviations (referred to symbolically herein as deltas) for a plurality of modes, the correct one being selected in dependence upon a given mode of operation; the addresses of both upper and lower fixed limits for the given parameter; the address in storage of the previous value used as a base for floating limits; the address of current values in storage which permits storing the present value of the parameter until it can be determined, at the end of a scan of all parameters, whether or not these parameters are to be recorded; and the addresses of the transducers or sensors — that is the actual input equipment — with which the parameter is related. Any parameter can have more than one parameter identifying number, so that polling of parameters can include more frequent polling of certain key parameters interspersed with sequential polling of all parameters, simply by providing the same connections for additional parameter numbers as may be provided for the basic parameter number for a given parameter. Progression of logical sequence and control is provided simply by a parameter counter which counts successively for each parameter analysis period, thereby polling the various parameter numbers in sequence, together with a program counter which identifies four different function periods, each subdivided into eight times, there being clock signals to identify first and second halves of each of the clock times. Provision is made to utilize main storage as a printer buffer storage as well as a one-scan recorder buffer storage.

18 Claims, 12 Drawing Figures

SELECTIVE DATA HANDLING APPARATUS

This is a continuation of application Ser. No. 803,372 filed Feb. 28, 1969, and now abandoned.

BACKGROUND OF THE INVENTION

1. Field of Invention

This invention relates to data handling apparatus, and more particularly to apparatus for selectively transmitting a plurality of items of data in dependence upon the value of the data involved.

2. Description of the Prior Art

The advent of the large scale, general purpose computer has given rise to more and more analyses of process history, apparatus performance and conditions, based upon data taken to identify values of various parameters of the apparatus or other conditions. The computers are properly programmed to identify the data and to perform logical and arithmetic functions thereon, in a gross and comprehensive manner, so as to provide information indicative of operating history or physical condition of various portions of the apparatus or related parameters.

One such usage of computers which has recently come into prominence is the analysis of actual parameters taken on an aircraft while in flight. Both analog and digital functions may be monitored, a number of the digital functions being discrete (such as choice of navigation radio receivers). Examples of analog parameters which are monitored in an aircraft data system of the type described include: engine exhaust temperature; cabin air pressure; engine speed; flap position, etc. From data of this type, it is not only possible to extract information relating to conditions during flight, but it is also possible to determine the inception of faults within the engines or frame of the aircraft, including establishing the need for either minor or major overhaul of various parts thereof.

In aircraft data systems known to the art, a fixed time sequence of scanning is utilized to poll the various parameters and record the values thereof on magnetic or paper tape, the record so produced being utilized on the ground in the computer to analyze the history of the aircraft's flights over the recording period, as well as to analyze conditions of various parts of the aircraft. However, so much data is taken in such a recording system that the computer or other computation apparatus is literally choked with the magnitude of the data, and must perform innumerable routines in order to extract data of significance for analysis purposes.

SUMMARY OF INVENTION

The object of the present invention is to selectively identify data which has significance in a data handling system in order to reduce the gross amount of data collected for purposes of analysis.

According to the present invention, data is analyzed for significance in various ways for selective recognition as useful data. In accordance further with the present invention, data is compared against fixed limits. In further accord with the present invention, data is compared against floating limits. In still further accord with the present invention, the analysis of data for significance is adaptive, changing in dependence upon conditions to which the data relates.

According to the invention:

a plurality of parameters are polled in a sequence, a given parameter may have a plurality of positions in the polling sequence;

the values of parameters polled in a complete sequence are selectively transmitted in dependence upon any of them having a value of significance during the particular polling sequence;

the values of parameters are compared against either fixed or floating limits, or both of them;

fixed limits are established indicative of dangerous or unsatisfactory conditions;

the exceeding of fixed limits may result in transmitting the parameter identification and the time at which the limit was exceeded in addition to transmission of a full polling sequence of data for further analysis;

the return of a parameter value to a magnitude within fixed limits may result in similar parameter transmission;

the exceeding of fixed limits may go unrecognized for a number of times to allow for transient and noise conditions; the number of times may be adjusted to suit noise conditions of each related parameter;

adaptive operation is in response to a mode defining means which in turn analyzes at least some of the parameters being analyzed; operation or actual limits utilized can vary in dependence upon the current mode being defined;

adaptive, floating and fixed limit analysis is combined with fixed time period polling and transmission; both fast and slow transmission may occur in dependence upon adaptive mode control;

a slow transmission mode may be utilized in addition to selective transmission, thereby causing recording on a long time interval basis, ignoring the exceeding of any limits insofar as transmitting purposes are concerned during the intervals;

history of the significance of the data is maintained even during slow mode of operation;

the exceeding of limits of one kind causes specific operation to identify the parameter that is exceeding the limit, and the time at which it is exceeded, further transmission of this type being suspended until such time as the parameter comes back within limits, at which time the parameter identification and the time again undergo the same form of transmission;

transmission of all parameter values under mode control is combined with the transmission of an individual parameter identification when its value crosses a fixed limit line, either going out of limits or coming back into limits;

the values relating to one scan of all parameters are all transmitted together in the event that any one parameter in the scan has a value which is out of limits during a parameter-controlled mode, the values of no parameters being transmitted except in dependence upon fixed time controls when none of them has a value exceeding limits.

The criteria for testing values of parameters are keyed to indicate that the particular test is not to be performed relative to a given parameter by having either a criteria or a criteria address of a detectable given kind in the case where a given parameter is not to be tested against that criterion.

Other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
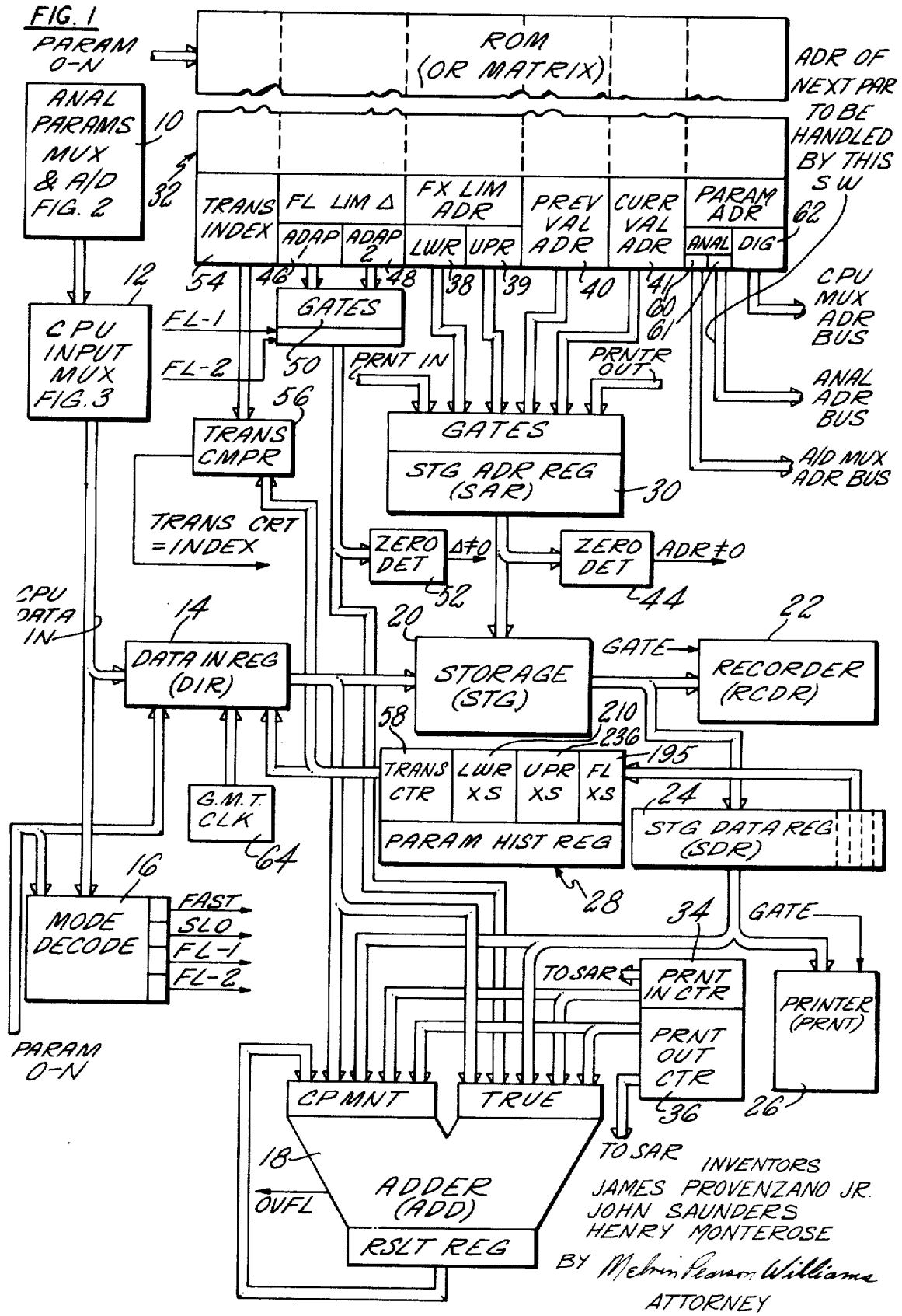
FIG. 1 is a schematic block diagram of the major elements of a preferred embodiment of the invention.

System - FIG. 1

Figure 2:
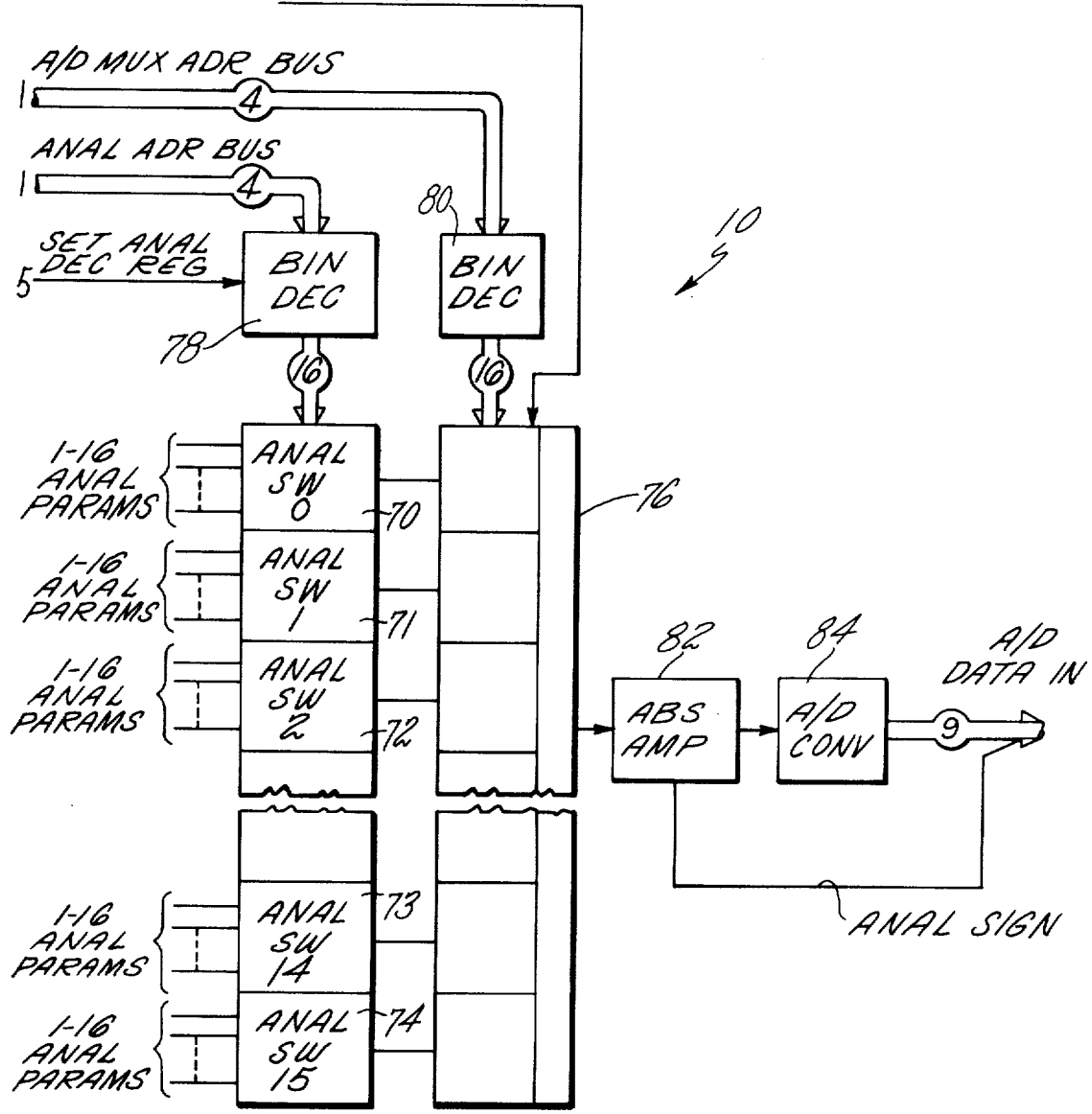
FIG. 2 is a simplified schematic block diagram of analog input circuitry.
Figure 3:
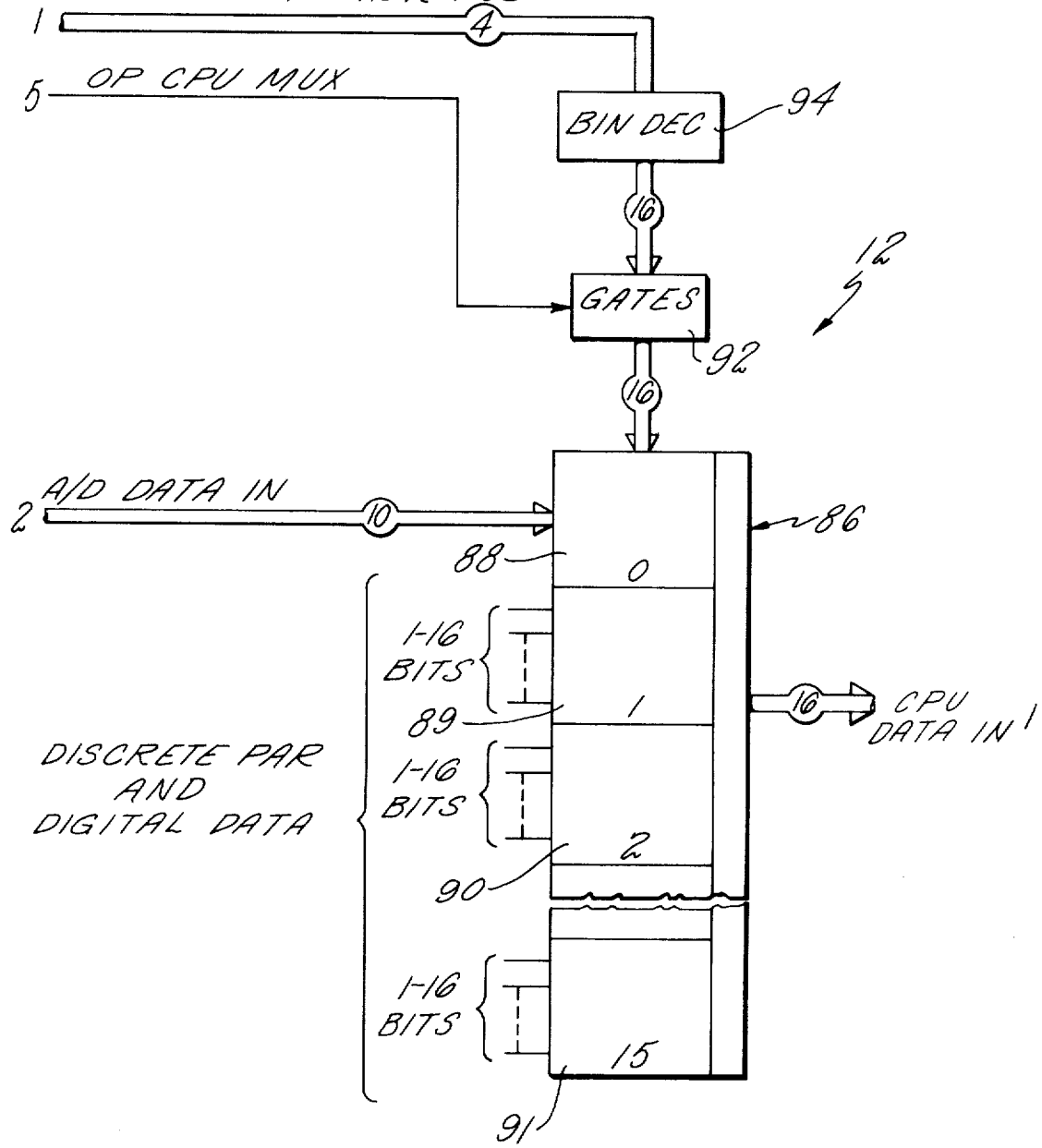
FIG. 3 is a simplified schematic block diagram of a data input multiplexer.

Referring now to FIG. 1, one embodiment of the present invention includes inputs from an analog parameter multiplexer and analog to digital conversion circuitry 10 (ANAL PARAM MUX & A/D) (the details of which are illustrated in FIG. 2 and described hereinafter) which in turn becomes one of the inputs to a central processing unit input multiplexer (CPU INPUT MUX) 12 (illustrated in FIG. 3 and described in detail hereinafter). The multiplexers 10, 12 provide inputs to a DATA in REGister (DIR) 14 as well as to a MODE DECODE circuit 16. Once the data is lodged in the DIR 14, it is available as either a plus (TRUE) or minus (CPMNT - complement) input to an ADDER 18 and as an input to a main STORAGE device (STG) 20. Data in the STORAGE may be read out selectively to a RECORDER (RCDR) 22 when gated to do so, and is always read automatically in a read operation to a storage data register (SDR) 24. The data in the SDR 24 is available when properly dated as an input to a PRINTER (PRNT) 26 and is also available as plus or minus inputs to the ADDER 18. The low order bits of the SDR 24 are not connectable to the PRINTER 26 or the ADDER 18, but are made available to a parameter history control register and counter (PARAM HIST REG) 28 for analysis and up-dating in the control of printing and recording of floating (FL) and upper (UPR) and lower (LWR) fixed limit value excesses (XS) and transient counting (TRANS CTR).

The main STORAGE 20 is controlled, inter alia, by a storage address register (SAR) 30 which receives inputs selectively from various outputs of a read only memory (ROM) 32, or from a printer in counter (PRNT IN CTR) 34 (bottom right of FIG. 1) or from a printer out counter (PRNT OUT CTR) 36. The outputs from the ROM 32 as inputs to the SAR 30 include the address of the lower fixed limit (FX LIM ADR - LWR) 38, the address of the upper fixed limit (FX LIM ADR - UPR) 39, the address of a previous value used as a base for floating limit tests (PREV VAL ADR) 40 and the address of the current parameter value (CURR VAL ADR) 41. All of these values are available in response to the parameter identification number (PARAM O - N) which is used as an input to the ROM 32, as described in detail hereinafter. The output of the SAR 30 is continuously connected to a zero detect circuit 44 which develops a signal (ADR ≠ 0) whenever the content of the SAR 30 is other than an all zero indication. An upper or lower limit address of all zeros is an indication that there is no fixed limit to be compared on the particular parameter being polled.

The ROM 32 also provides floating limit deviations, which can vary depending upon particular current mode of operation. These deviations are identified symbolically in this embodiment by the delta symbol. Thus, the read only memory 32 provides a floating limit deviation for a first adaptive mode (FL LIM Δ - ADAP 1) 46 and a deviation for floating limit analysis in a second adaptive mode (FL LIM Δ ADAP 2) 48. The floating limit deviations are applied by the ROM outputs 46, 48 to a set of gates 50 which will supply one of said outputs 46, 48 to a zero detect (ZERO DET) circuit 52 and to the positive input (TRUE) of the adder 18. The zero detector 52 supplies a signal whenever the deviation being passed through the gates 50 is not equal to zero (Δ ≠ 0) thus allowing the present embodiment to avoid floating limit computations whenever floating limits are not to be applied to a given parameter due to a selected one of the outputs 46, 48 being established as zero for any parameter which is not to be analyzed for floating limit excesses.

The ROM 32 also supplies a transient index (TRANS INDEX) 54 for each parameter. This index may be ONE if no transients are to be allowed prior to acting upon the value of a parameter exceeding a fixed limit. The transient index output 54 permits the indicies for various parameters to differ so that a parameter likely to be on a noisy line may ignore several indications of the value exceeding fixed limits, whereas an inherently quiet line or a line having more urgent significance may allow only one or two occurrences of excess prior to recognizing the excess and acting upon it. The transient index output 54 is applied to a transient compare circuit (TRANS CMPR) 56 which also receives an input from the transient counter 58 of the parameter history register 28. The transient counter (TRANS CTR) 58 is up-dated during each scan of the current parameter in order to keep track of how many times a fixed limit may have been exceeded by that parameter, and when the content of the transient counter 58 equals the value of the transient index 54, the transient compare circuit 56 develops a signal indicative of the fact that the transient counter equals the index (TRANS CTR = INDEX). Then the apparatus in accordance herewith can act on the fixed limit excess. The content of the transient counter 58 (along with the rest of the parameter history register 28) is transferred to the DIR 14 to be stored as a part of the current parameter value near the end of parameter handling time so that the setting of the transient counter for the particular parameter will be available the next time that parameter is scanned.

The ROM 32 also provides parameter addresses (PARAM ADR) both for analog inputs (ANAL) 60, 61 and for digital parameters (DIG) 62. These are addresses used to identify the particular sensor, transducer, or other source of parameter value associated with the particular parameter under analysis in the sequence of parameters during a polling operation. The analog parameter address outputs 61, 61 are applied to the analog parameter multiplexer 10 and the digital parameter address output 62 is applied to the CPU input multiplexer 12, as described more fully with respect to FIGS. 2 and 3, hereinafter.

The DIR 14 is also used to assemble printer words to identify a parameter, the time, and whether an upper or lower limit was exceeded in order to facilitate a record produced by the printer 26 of each initial instance of exceeding a fixed limit by any parameter, as well as the instance of that parameter falling back into fixed limits at a later time. For this purpose, the parameter identifying number, which is simply the current setting of a parameter counter (described with respect to FIG. 4 hereinafter) as well as the output of a Greenwich Mean Time clock (G.M.T. CLK) 64 are applied to the DIR 14. The parameter identification number is also used as an address within the MODE DECODE circuit 16 so as to permit up-dating the value of any parameter used in the mode decode to determine in which mode the apparatus should be operating.

INPUTS - FIGS. 2 AND 3

In the remaining figures, numbers on the right-hand margin indicate figures to which the related signal line connects. Numbers on the left-hand margin indicate figures where the signal on a related line is generated; reference to FIG. 4, from which all sequence (e.g., clocking) signals derive, are mostly eliminated for simplicity.

Referring now to FIG. 2, a generalized illustration of analog parameter source inputs is shown. Therein, a plurality of analog switches 70-74 may each respond to as many as 16 different analog parameters, and the output of each is fed to a corresponding input of an analog multiplexer 76. Within each of the switches 70, 74 connections between its output and a selected one of its inputs will be made in dependence upon a particular one of 16 signals supplied to all of the switches 70-74 of concomitantly, in parallel, by a binary decoder (BIN DEC) 78. The binary decoder 78 is so arranged that it will connect a given parameter from some part of a preceeding cycle into the current cycle to allow the connection to become stable before being sampled by the analog multiplexer 76, as described in more detail hereinafter. The binary decoder 78 may include an input address register so as to respond to the four analog address bits applied on wires included within the ANAL ADR BUS (from FIG. 1). Then, this address will become operatively set into the registers in response to a signal on a SET ANAL DEC REG line, which signal appears after the current parameter has been switched through the analog multiplexer 76 and will remain so set until the following parameter has been passed through the analog multiplexer 76. The analog multiplexer 76 similarly responds to 16 different signals supplied by a binary decode circuit (BIN DEC) 80 in response to the particular combination of four signals applied on wires included within the A/D MUX ADR BUS (from FIG. 1). However, the analog multiplexer 76 is operative to connect the output of the selected one of the switches 70, 74 through its output to an absolute amplifier (ABS AMP) 82 only in response to the presence of an analog multiplexer operating signal on an OP ANAL MUX line. The signal on this line will be present for a sufficient time to allow the particular selected analog parameter passing through one of the switches 70, 74 and the analog multiplexer 76 to establish a stable output from the absolute amplifier 82 as an input to an analog to digital converter (A/D CONV) 84. The absolute amplifier 82 converts the analog input to a signal of a known polarity for handling by the A/D converter 84, but also supplies a signal on an ANAL SIGN line to become one of the digitized inputs on the trunk of lines in the A/D DATA IN bus. This bus is applied as one input to the CPU input multiplexer 12 which, as is illustrated in detail in FIG. 3, includes a multiplexer proper 86 having a plurality of sections 88-91, each of which is capable of supplying up to 16 bits of data from related parameter sources through the multiplexer proper 86 to the CPU DATA IN bus for input to the central processing unit (defined as most of FIG. 1). The selection of which of the sections 88-91 is to be passed through the multiplexer proper 86 is dependent upon the energization of a related one of 16 lines passing from a plurality of gates 92 to the multiplexer proper 86. The gates 92 are energized in response to a CPU multiplexer operating signal on an OP CPU MUX line in response to the output of a binary decoder (BIN DEC) 94 which in turn is responsive to the CPU multiplexer address signals on the CPU MUX ADR bus. It should be noted that the numbers utilized in FIGS. 2 and 3 herein are illustrative merely, and have been eliminated from FIG. 1 since the width of any data flow is well within the skill of the art and not germane to the present invention beyond illustrating an exemplary embodiment.

MAIN CONTROLS FIG. 4

The remaining FIGS. (4–12) are schematic block diagrams including logical circuit elements and functional blocks. The logical circuit elements utilized herein include the logical AND circuit identified with A; the logical OR circuit identified by O; the logical inverter circuit identified by I; and a logical bistable device identified with S and R, which is set in response to a line or a circuit disposed at the left edge of the block near the S and, when set, provides a signal on a line leaving the right edge of the block hear the S, and is reset by a signal from a logical block or a line adjacent the left edge near the R and provides a signal on a line leaving the right edge of the block near the R when it is reset — when set, there is no signal from the reset side and vice versa. No arrows are shown on input lines to the logical blocks, all inputs are at the left and all outputs are from the right in these logical element blocks. In all functional blocks, arrows indicate propagation of information signals.

Figure 4:
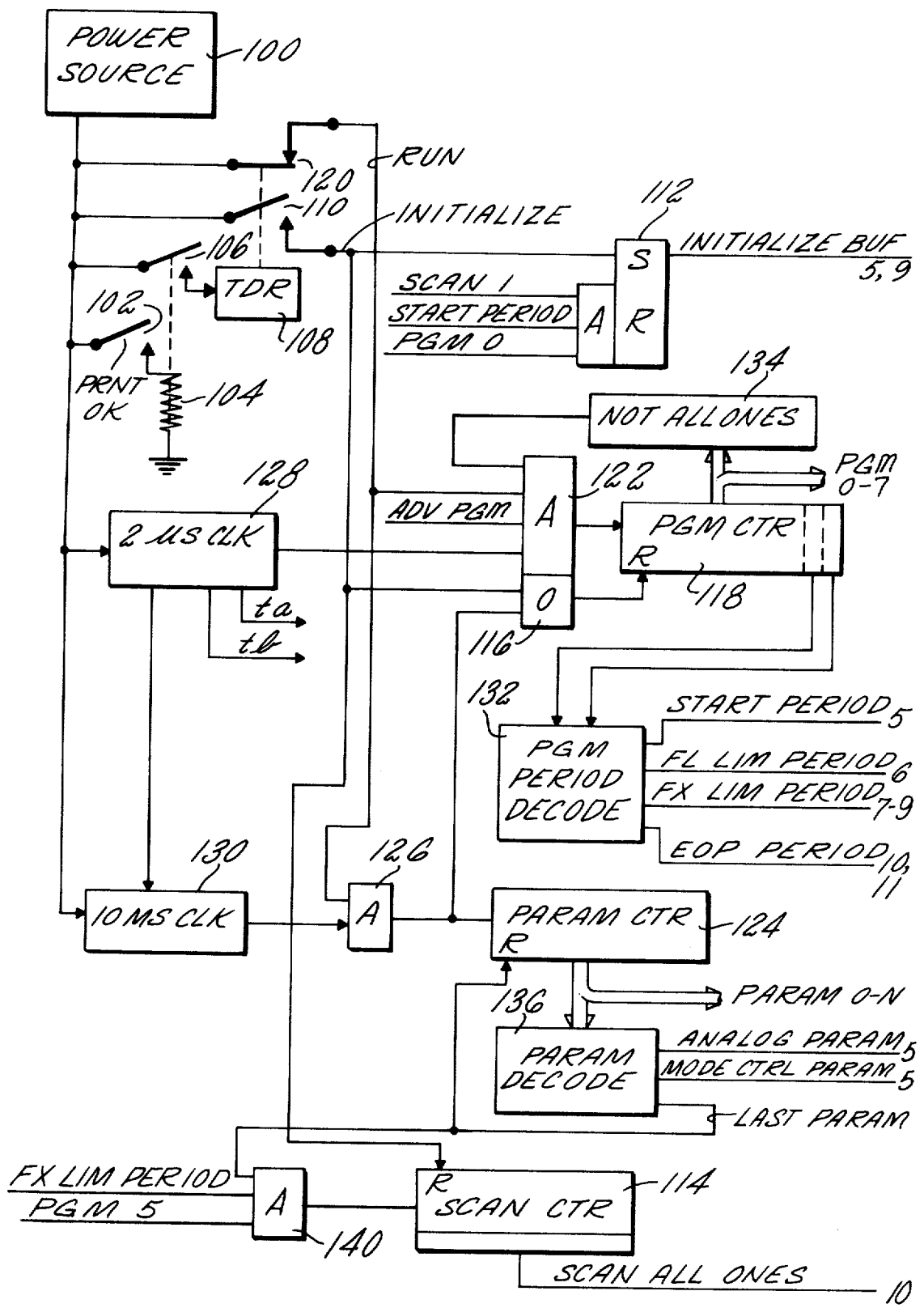
FIG. 4 is a schematic diagram of control and clock circuits for the embodiment illustrated in FIG. 1.

Overall control and sequencing of the present embodiment of the invention is in response to the circuitry of FIG. 4. The operation of the present embodiment is designed to commence with the appearance of power (such as when an aircraft switches from auxiliary power to a momentary power off condition and then onto its own power, or vice versa). Thus, a POWER SOURCE 100 (FIG. 4) is not only the conventional source of energy for the operation of the circuits, but also the control for initializing operation and commencing sequencing at a known starting point. Attached to the power source 100 is a switch point 102 indicative of the fact that the printer is capable of operation (PRNT OK), which is an arbitrary definition in this embodiment that if the printer cannot operate then all other functions will cease. However, it should be understood that this function can be eliminated so that recorder operations and limit up-dating may continue even though the printer may have failed. In any event, a momentary lapse of printer operation will result, when it is restored by closing the switch 102, in the same sort of initializing operation as when power is initially applied by the POWER SOURCE 100, as is apparent from the following description.

Assuming the switch contact 102 to be closed, and power available from the source 100, a relay coil 104 will cause the closing of a related normally open contact 106 so as to apply power to a time delay relay (TDR) 108. Operation of the TDR 108 causes the closing of a contact 110 thus providing a signal on an INITIALIZE line. This causes the setting of an initialize buffer latch (or trigger or flip flop or other bistable device) 112, the output of which is utilized in FIGS. 5 and 9 as described hereinafter. The signal on the INITIALIZE line is also used to reset a scan counter (SCAN CTR) 114 (bottom, FIG. 4) and, through an OR circuit 116, to reset a program counter (PGM CTR) 118. This ensures that the program begins at the first program step (equal to a setting of all zeros in the program counter) and that counting the number of scans — the number of times that each of the parameters is polled in the entire sequence — will begin with the turn-on of power in the source 100.

When the time delay relay 108 times out, contact 110 opens and a normally closed contact 120 closes, thus supplying a signal on a RUN line. This permits the setting of the program counter 118 to be advanced by an AND circuit 122 and also permits the setting of a parameter counter (PARAM CTR) 124 to be advanced by an AND circuit 126. In the present embodiment, advancement of the program and parameter counters 118, 124 is in response to fixed timing provided by a 2 microsecond clock (2 US CLK) 128 and a 10 millisecond clock 130, respectively. This is permitted in the present embodiment since the rate of polling of the parameters is established at one parameter polled for each 10 millisecond period, because the polling of the various parameters is real-time related and polling of the parameters at any more frequent intervals is not meaningful in many embodiments, including the aircraft data embodiment used as an illustration herein. The 2 microsecond clock 128 not only provides a signal at the start of each 2 microsecond period to operate AND circuit 122, it also supplies signals indicative of the first half of the 2 microsecond period and the second half of the 2 microsecond period on lines identified, respectively, as *ta* and *tb*. These are used in a well known fashion to insure that certain events will not overlap, and to sample various outputs when it has been assured that they have become stable. The 2 microsecond clock 128 also synchronizes the 10 millisecond clock 130.

Basic control within the time of polling of each parameter is provided by the program counter 118 which may comprise, for instance, as in this embodiment, a five stage binary counter which advances from a setting of all zeros through binary progression to a setting of all ones, and which may be reset to the all-zeros condition. The two highest ordered bits of the program counter 118 are fed to a program period decode circuit (PGM PERIOD DECODE) 132 which decodes these two bits into four different logical periods: these include a START PERIOD which is utilized to read in the current parameter value, record the value of the same parameter during a previous scan (in the case where all of the parameters of the previous scan are to be recorded), and to transfer the data from the current value storage location relating to the transient counter and the upper and lower excess registers to the parameter history register 28 (FIG. 1, described hereinbefore). The functions which are performed during the start period are described with respect to FIG. 5, hereinafter. The next period provided by the program period decode circuit 132 is a floating limit period (FL LIM PERIOD) during which the parameter value may be compared against suitable floating limits, when appropriate. This is described in detail with respect to FIG. 6, hereinafter. Then follows a fixed limit period (FX LIM PERIOD) in which the parameter value is compared against upper and lower fixed limits when appropriate, and the history of fixed limit comparisons made in previous scans is analyzed and up-dated utilizing the values in the fixed limit control register 28. These functions are described with respect to FIGS. 7-9 hereinafter. The final control time with respect to each parameter is the end of parameter (EOP PERIOD), during which the record flag (which keeps track of whether or not this entire set of parameters is to be recorded) is up-dated, the current parameter value together with related fixed limit control information in the parameter history register 28 is stored in main storage 20, and printer input and output routines are performed (if main storage is used as a printer buffer, as in the current embodiment). Then the parameter counter will be advanced and the next parameter will proceed through the four periods of operation just described.

The three lower ordered bits of the parameter counter are used to identify program times within each of the periods. Thus, each of the periods identified by the outputs of the program period decode circuit 132 is subdivided into eight shorter timing periods identified herein as PGM O through PGM 7. The program counter 118 is incremented by signals from the AND circuit 122 which is operative only when there is concurrently present a signal indicating that the program may advance on an ADV PGM line (described hereinafter), a signal on the RUN line, and a signal from a not all ones detector 134. Thus, when the system is properly running, except in the case when the program counter has reached its maximum count, the AND circuit 122 will cause the program counter to be incremented once for each output of the 2 microsecond clock 128. However, when the program counter 118 is set to its maximum count, the NOT ALL ONES detector 134 will cause the AND circuit 122 to be blocked until the program counter 118 is reset to zero by its own resetting circuitry. Thus it is immaterial whether the program counter could normally roll to all zeros or is otherwise some sort of open-ended counter. The OR circuit 116 will reset the program counter at the same time as the AND circuit 126 advances the count of the parameter counter 124. Therefore, for each parameter in the polling sequence, the setting of the parameter counter 124 is advanced, the program counter 118 is rolled to zero and will thereafter be advanced once for each output of the 2 microsecond clock 128.

The output of the parameter counter 124 is used directly as a parameter identification for addressing the MODE DECODE 16 (FIG. 1) and as an input address to the ROM 32 (FIG. 1). It also feeds a parameter decode circuit (PARAM DECODE) 136 which in turn identifies those parameters which are analog by applying a signal on an ANALOG PARAM line and those parameters which are involved with defining modes by generating a signal on a MODE CTRL PARAM line. If desired, should the parameter counter 124 not have the same maximum count as the total number of parameters in the system, the parameter decode 136 can also identify the highest numbered parameter by presenting a signal on a LAST PARAM line to cause the resetting of the parameter counter 124. If the parameter counter 124 is an eight-bit binary counter, then 256 parameters may be utilized; if they are, the last parameter decode becomes an all ones detection function.

The signal on the LAST PARAM line is also fed to an AND circuit 140, the output of which will advance the scan counter 114. The AND circuit 140 is, however, only responsive during a point in time part way through a given cycle which is identified as being within the fixed limit control period during program time 5 as indicated by signals on the FX LIM PERIOD and PGM 5 lines. When the scan counter 114 reaches a maximum count (which may be all ones in the case when a seven bit counter issued and a total of 128 scans is significant to complete a record, frame or other grouping), then a detection circuit within the scan counter 114 may provide a signal on a SCAN ALL ONES line (which could be a misnomer in the case when the detector is detecting other than a maximum count of the scan counter 114). This signal may be utilized to cause automatic printing regardless of whether or not any limits are exceeded for each maximum setting of the scan counter 114 (as is described more fully hereinafter with respect to FIG. 10).

In summary, the sequence and control circuitry of FIG. 4 identify one parameter for every 10 milliseconds; within the 10 millisecond period related to a given parameter, the program counter will provide seven timing signals within each of four major timing periods, thus to control the sequencing of operation. It should be noted that this illustrative form of control is relatively simple, and is possible since electronic circuitry utilized in virtually any embodiment of the present invention can operate at speeds which are far in excess of the speed at which polling of the various parameters occurs 10 milliseconds each. Of course, there are innumerable other basic control philosophies which could be implemented in a given embodiment of the invention, without altering the practice of the present invention.

The basic timing sequence of the present embodiment is believed to be well illustrated in terms of the sequence of presentation of the various control circuits (FIGS. 5 through 12) and therefore timing diagrams are not included herein. By proceeding with these figures in sequence, from top to bottom, the times at which various functions occur appear in order and are believed to be illustrative of the timing concepts involved. This form of presentation, however, causes several related functions to be generated at different places: for instance, storage may be read in response to signals generated on several of the figures, and they would logically be passed through a single OR circuit to provide a general read storage command signal, which however has been eliminated herein for simplicity since it is well within the skill of the art. This will become more apparent as the description proceeds. It is to be noted, that for simplicity, control lines which are necessarily connected to functional blocks illustrated in FIG. 1 have for the most part been deleted therefrom. It is considered to be within the skill of the art that signal lines such as those from the AND circuit 162 can be carried to match with similarly identified signal lines (OP CPU MUX, FIG. 3) or can be connected directly without indicating connecting lines as in the case of the connection with the SAR 30 (FIG. 1).

START PERIOD - FIG. 5

Figure 5:
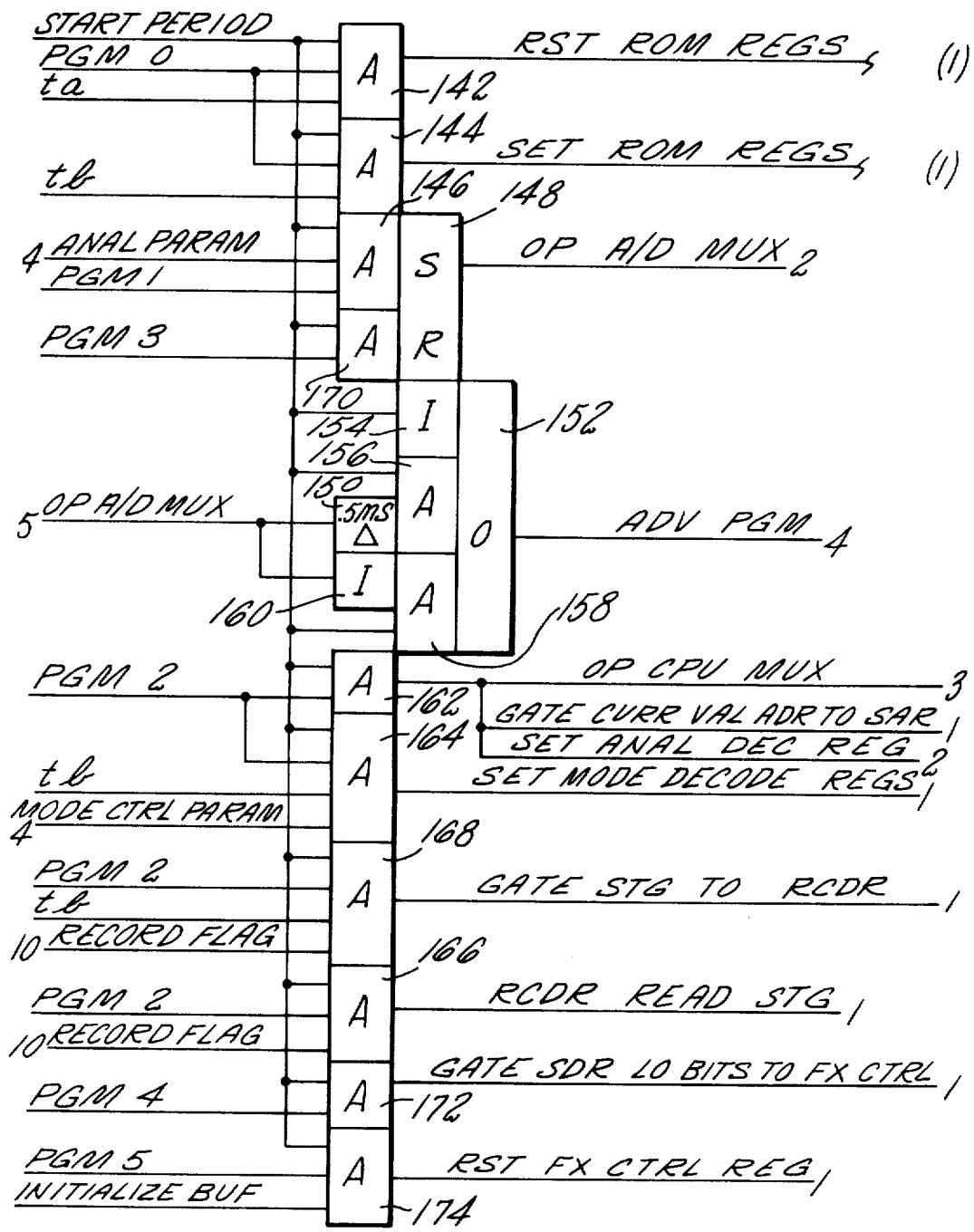
FIG. 5 is a schematic block diagram of control circuitry operative during a start period.
Figure 6:
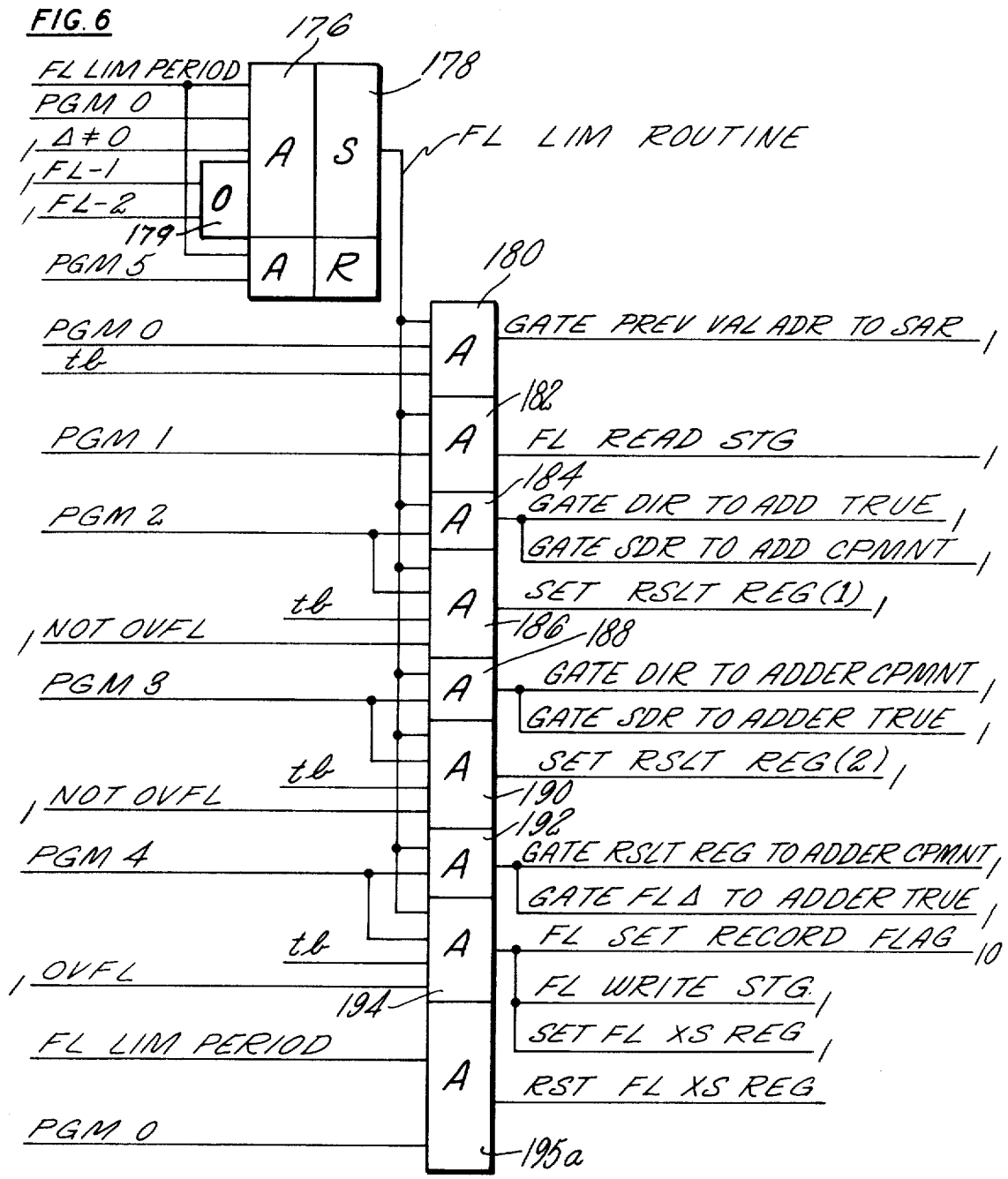
FIG. 6 is a schematic block diagram of control circuitry operative during a floating limit period.

The functions performed during the start period are illustrated in FIG. 5. The first function which occurs during program zero time is illustrative merely, and illustrates that in the event registers are desired at the output of the ROM 32 (FIG. 1), these registers can be reset during the first half of program zero time and then set during the second half of program zero time. However, in the present embodiment these functions are unnecessary since the outputs of the ROM 32 can be a direct flush from the parameter counter input thereto, without any need for registers. This fact is indicated by breaking away the output lines of a pair of AND circuits 142, 144 related to these functions. During program time 1, provided an analog parameter (ANAL PARAM) is indicated by the parameter decode circuit 136 (FIG. 4), an AND circuit 146 will cause the setting of a latch 148, the output of which comprises a signal to operate the analog to digital multiplexer (FIG. 2) on the OP A/D MUX line. Once the analog to digital multiplexer is operated, it is desirable to allow a significant period of time to pass in order that the input from the particular analog parameter to the analog to digital converter can settle, so as to provide a stable digital output having meaning. To permit this in the case where an analog parameter is involved, the OP A/D MUX line is also applied to a half-millisecond delay circuit (0.5 MS Δ) 150, which will provide an output signal half a millisecond after the signal first appears at the output of the latch 148. The half-millisecond settling time is provided by preventing the program counter 118 (FIG. 4) from advancing its count once the program time 1 is reached during the start period, because of the fact that the advance program signal input to the AND circuit 122 (FIG. 4) is blocked once this stage of the program is reached and until the half-millisecond delay is completed. This is achieved in FIG. 5 by an OR circuit 152 which generates the program advancing signal on the ADV PGM line, it being capable of operation in response to an inverter circuit 154 at any time except during the start period, and also being operable by either of two AND circuits 156, 158. Thus, the program counter can be advanced during the fixed, floating and end of parameter periods in response to an output from the inverter 154, which will have an output during these times since there will be no input thereto. During the start period, the AND circuit 158 will be operative until such time as it is blocked by the output of an inverter 160 as a result of setting of the latch 148 which provides a signal on the OP A/D MUX line. Once this input is present at the inverter 160, the inverter no longer supplies a second signal to the input of the AND circuit 158. The AND circuit 156, on the other hand, cannot operate the OR circuit 152 until the time out of the half-millisecond delay circuit 150. Thus the program will hang up at program time one of the start period and will resume after the expiration of the half-millisecond delay time.

In the event that a non-analog parameter is the current parameter being polled, then the latch 148 is not set so that AND circuit 158 will continue to permit the OR circuit 152 to generate the program advancing signal thus allowing AND circuit 122 (FIG. 4) to continue to pass clock signals to advance the program counter 118.

When the half-millisecond delay circuit 150 has timed out, then the program counter will again be advanced causing the appearance of a signal relating to program time 2. This will cause an AND circuit 162 to operate, generating a signal for operating the CPU multiplexer on the OP CPU MUX line, which in turn causes data to be entered into the DIR 14 (FIG. 1). It also provides a signal to be gated input of the SAR 30 (FIG. 1) to cause the data at the previous VALUE address output 40 of the ROM 32 to be set into the SAR 30, this signal appearing on a GATE CURR VAL ADR TO SAR line. Further, it causes the analog address output 61 of the ROM 32 to be set into the register of the binary decode 78 (FIG. 2) so that switching and line settling for the next analog parameter can commence. Program time 2 also causes the operation of an AND circuit 164, only during the second half of the program time due to the *tb* signal, and only in the case when the particular parameter involved is a mode control parameter as indicated by a signal on a MODE CTRL PARAM line from the parameter decode 36 in FIG. 4. This causes a signal to be presented to the mode decode circuit 16 (FIG. 1) to cause a particular one of the registers (related to the parameter count) therein to respond to the current parameter value on the CPU DATA IN bus (FIG. 1). This enables the mode decode 116 to be up-dated as a result of any change in value in a parameter used for mode control prior to analyzing that parameter. Of course, it is possible that a parameter is off limits and therefore, in a sense, in error, and it might therefore cause an erroneous operation of the mode decode circuit. However, it should be understood that the present embodiment encompasses a plurality of discrete parameters from which mode decode operations can be controlled, such parameters not having limits to be compared and not being assumed to be erroneous at any point of time. On the other hand, the mode decode circuit 116 could be provided with manual override mode defining means which could be momentarily operated from time to time, such as by a flight engineer, in an aircraft embodiment, or it could be provided with a simple manual control in the event that mode definition is defined in any given utilization of the present invention to be independent of the actual parameter values being sensed. However, in the present embodiment of the invention, it is assumed that those parameters which operate the mode decode 16 are discrete parameters (such as "engines on," wheels up etc.) and are therefore not parameters which themselves are tested for limits.

Figure 10:
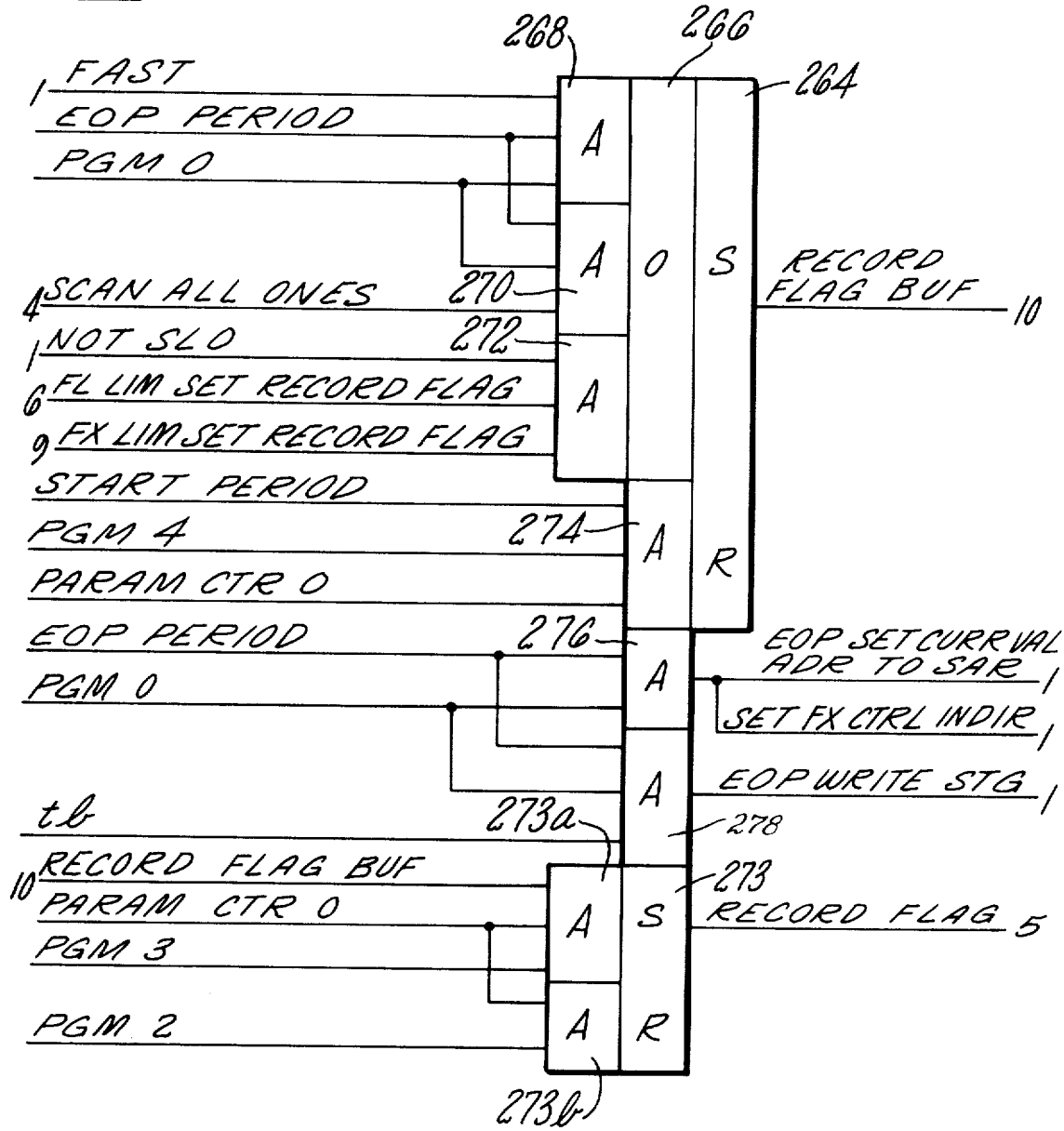
FIG. 10 is a schematic diagram of recording control circuitry operative during an end of parameter period.
Figure 11:
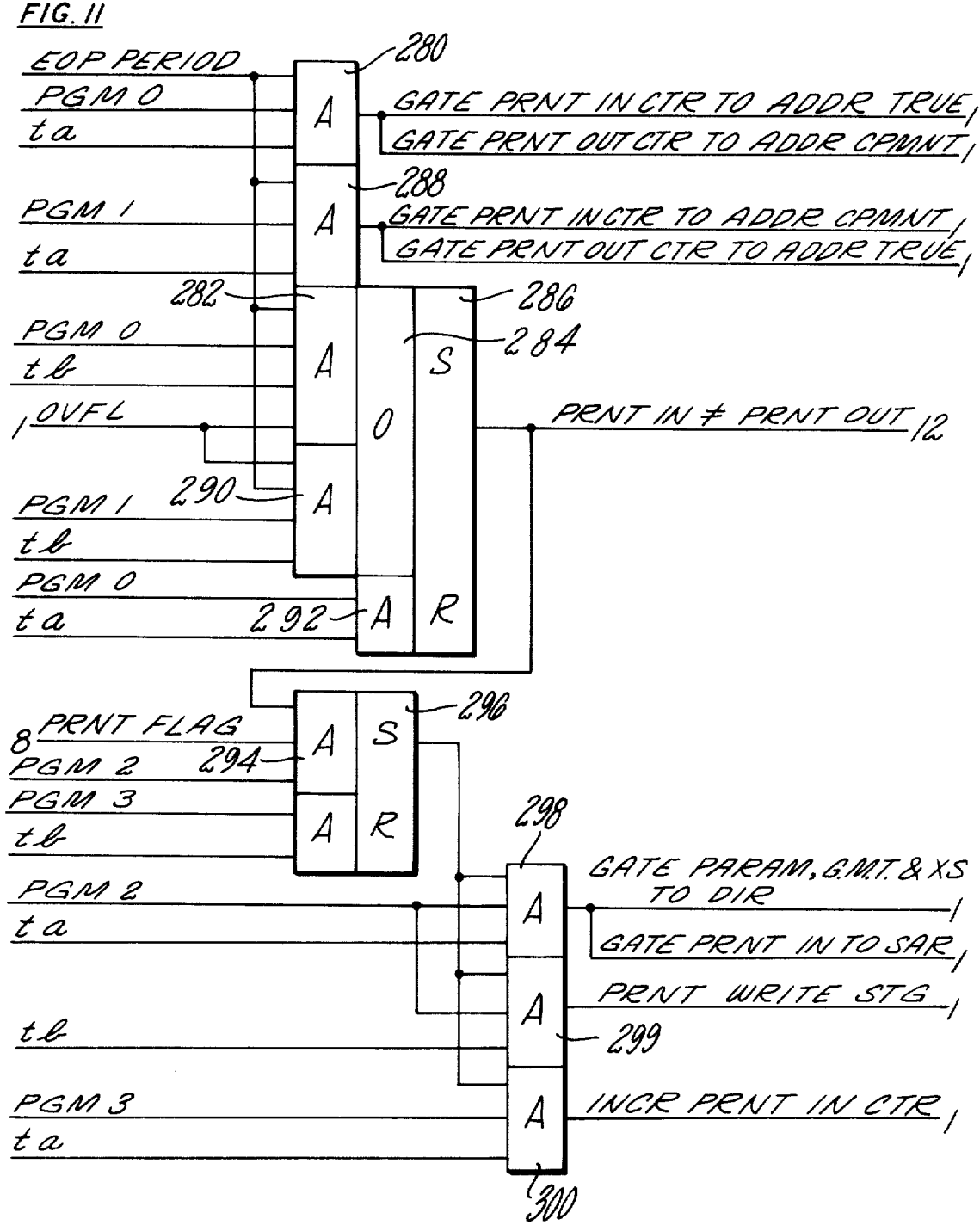
FIG. 11 is a schematic diagram of printer set up and a printer buffer input routine of an end of parameter period.

Program time 2 during the start period (FIG. 5) also causes the operation of an AND circuit 166 in the case where a signal is present on a RECORD FLAG line indicating that the previous scan of parameters is to be recorded either because of the fact that the maximum number of scans have been completed in the previous scan, because the time out for a slow or fast mode has occurred, or because any of the parameters in the previous scan has exceeded a limit, as is described more fully hereinafter with respect to FIG. 10. The operation of the AND circuit 166 generates a signal which indicates that the storage 20 (FIG. 1) is to perform a read operation relating to providing the previous value of this parameter for recording by the recorder 22 (FIG. 1) on a RCDR READ STG line. During the second half of program time 2, a related AND circuit 168 provides a signal to gate the output of storage directly into the recorder 22 (FIG. 1) on a GATE STG TO RCDR line. Thus, when the storage output is ensured, the recorder will respond to it. This line is identified as "GATE" at the input of the recorder 22 in FIG. 1. It is to be noted that the location read in storage at this time is the current value location, which has been identified by the AND circuit 162 (FIG. 5) causing the current value address to be placed in SAR 30 (FIG. 1). This current value is, however, the value of this parameter during the previous scan. Thus, at the start of handling each parameter, its last previous value is sent to the recorder from storage, in the case where the value of parameters for the previous scan is to be recorded as described hereinbefore.

At program bits three of the start period an AND circuit 170 (upper FIG. 5) causes the resetting of the latch 148 to end the A/D multiplex operating signal. At program time 4 of the start period, an AND circuit 172 (lower FIG. 5) generates a signal which causes the low order bits of the SDR 24 (FIG. 1) to be transferred to the parameter history register 28, this signal appearing on a GATE SDR LO BITS TO FX CTRL line. This line is not illustrated in FIG. 1 for simplicity, and its connection is to a plurality of AND circuits or other gates which are directly responsive to the setting of the SDR 24 and cause a flow into the parameter history register 28. The content of the parameter history register is meaningless whenever power goes down or a long lag in operation results from the printer not being ready, so an AND circuit 174 is provided to cause the content of the parameter history register 28 (FIG. 1) to be reset by a signal on a RST FX CTRL REG line during program time 5 of a start period in response to a signal indicating initialization on the INITIALIZE BUF line. In all other cases, the history of the given parameter with respect to exceeding fixed limits is maintained, as described hereinbefore, by the parameter history register 28.

Then follow two program times (6 and 7) of the start period where no functions are performed in the present embodiment, except for the fact that the program counter continues to count for two more pulses and eventually changes the setting of the high order bits from 00 (defined as the start period herein) to 01 (defined as the floating limit period herein).

FLOATING LIMIT PERIOD - FIG. 6

At the start of the floating limit period (FIG. 6), an AND circuit 176 may set a floating limit routine latch 178 in dependence upon the presence of a program time 0 signal, a signal from the zero detect circuit 52 (FIG. 1) on the $\Delta \neq 0$ line, and an output from an OR circuit 179 indicating that one of the floating limit modes is being designated by the mode decode 16 (FIG. 1) by presenting a signal on either the FL-1 or FL-2 lines. Thus, at program time 0 of the floating limit period, if the apparatus is in a floating limit mode and if the deviation relating to the given parameter is not zero, then a floating limit routine will be established within the floating limit period as identified by a signal on the FL LIM ROUTINE line. Thereafter, if a floating limit routine is to be performed, the remainder of the floating limit period is defined by the floating limit routine signal rather than by a floating limit period signal. In the event the latch 178 is not set, then nothing occurs until the program counter counts through seven more steps to enter the fixed limit period by causing the high order bit to advance from 01 to 10.

When a floating limit routine is set (FIG. 6), it is set at the start of program time zero. Thereafter, in the second half of program time zero as defined by a $tb$ signal, an AND circuit 180 will generate a signal to pass the address of the previous value (used for this parameter as a base for floating limit comparisons) from the ROM previous value output 40 to the SAR 30 (FIG. 1). This signal appears on a GATE PREV VAL ADR TO SAR line. Next, in program time one, an AND circuit 182 generates a signal indicating that floating limit controls require the reading of storage on a FL READ STG line. This provides the floating limit previous base value within the SDR 24 (FIG. 1). In program time 2, an AND circuit 184 causes the current value to become a positive input to the adder and the previous value to become a negative input to the adder; this results from signals on the GATE DIR TO ADD TRUE line and the GATE SDR TO ADD CPMNT line. During the second half of program time 2, as controlled by a $tb$ signal, an AND circuit 186 will cause the adder result register to be set with the result of the subtraction performed, provided there is no overflow. One input to the AND circuit 186 is indicated "NOT OVFL"; this is the logical complement of the OVFL output of the adder 18 (FIG. 1) and is obtained either by using the complementary output side of an output circuit within the adder, or by passing the OVFL signal through an inverter. For simplicity, this is shown simply as the logical complement in FIG. 6. The AND circuit 186 provides a signal on the SET RSLT REG line to the adder 18 in FIG. 1. If the true input is higher than the complement input, then there will be no overflow from the adder, and the current value is higher than the previous value. On the other hand, if the current value in the DIR 14 (FIG. 1) is lower than the previous value in the SDR 30 (FIG. 1), an erroneous result, that is in complement form, will appear at the input to the result register, and there will be an overflow from the adder. Thus the AND circuit 186 simply recognizes the case when the result being presented to the result register is a proper true number. If it is not, a pair of AND circuits 188, 190 will provide the correct result during program time 3 wherein the connection from the DIR and the SDR are reversed by AND circuit 188, and again AND circuit 190 tests the overflow during the second half of program time 3 so as to set the result register provided there is no overflow from the adder. It is immaterial whether the correct result is reached in program time 2 or in program time 3; the unsuccessful result will not effect the result register, and the successful result will, regardless of the order in which the testing of the overflow is performed. In any event, by the end of program time 3 of a floating limit routine, the absolute value difference between the previous parameter value used as a base for floating limit deviation comparison and the current parameter value will be set in the result register. Then, during program time 4, the result achieved is subtracted from the floating limit deviation to test the current parameter value to see if it is within the floating limit, and if it is not, the record flag may be set so as to cause recording of this entire scan of parameter values during the next scan, and the content of the previous value storage location is up-dated by causing the contents of the DIR (which is permanently available at the input to storage 20) to be stored in storage 20 (FIG. 1). This is all achieved by a pair of AND circuits 192, 194 (bottom, FIG. 6). Note that the AND circuit 194 responds to a signal indicating an overflow from the adder 18 on the OVFL line such that if the deviation provided by the ROM 32 is in fact equal to or greater than the difference stored in the result register, the test is successful and the AND circuit 194 will not operate because there will be no overflow signal. If the deviation is smaller than the difference, then the current value exceeds or is less than the previous value by more than the floating limit differential and there will be an overflow; AND circuit 194 will cause setting of the record flag and the current value of the parameter in the DIR 14 to be placed in the previous value address in storage 20 for use in subsequent testing of floating limits. It is this aspect of the floating limit routine in the present embodiment that causes the floating limit test to, in fact, be "floating." That is, whenever the deviation is exceeded, then a new base is established for testing parameter values. The AND circuit 194 also causes a floating limit excess register (FL XS) 195 (in the parameter history register 28, FIG. 1) to be set so that the fact of exceeding a floating limit will be available for recording, as described hereinafter. The floating limit excess register 195 is reset for each parameter by an AND circuit 195a at program time 0 of the floating limit period.

Following program time 4 of a floating limit routine within a floating limit period, no further functions are performed except that the program counter 118 (FIG. 4) continues to count until it finally causes a change in the high order bit from 01 to 10 thus indicating the start of a fixed limit period.

FIXED LIMIT PERIOD - FIGS. 7 - 9

Figure 8:
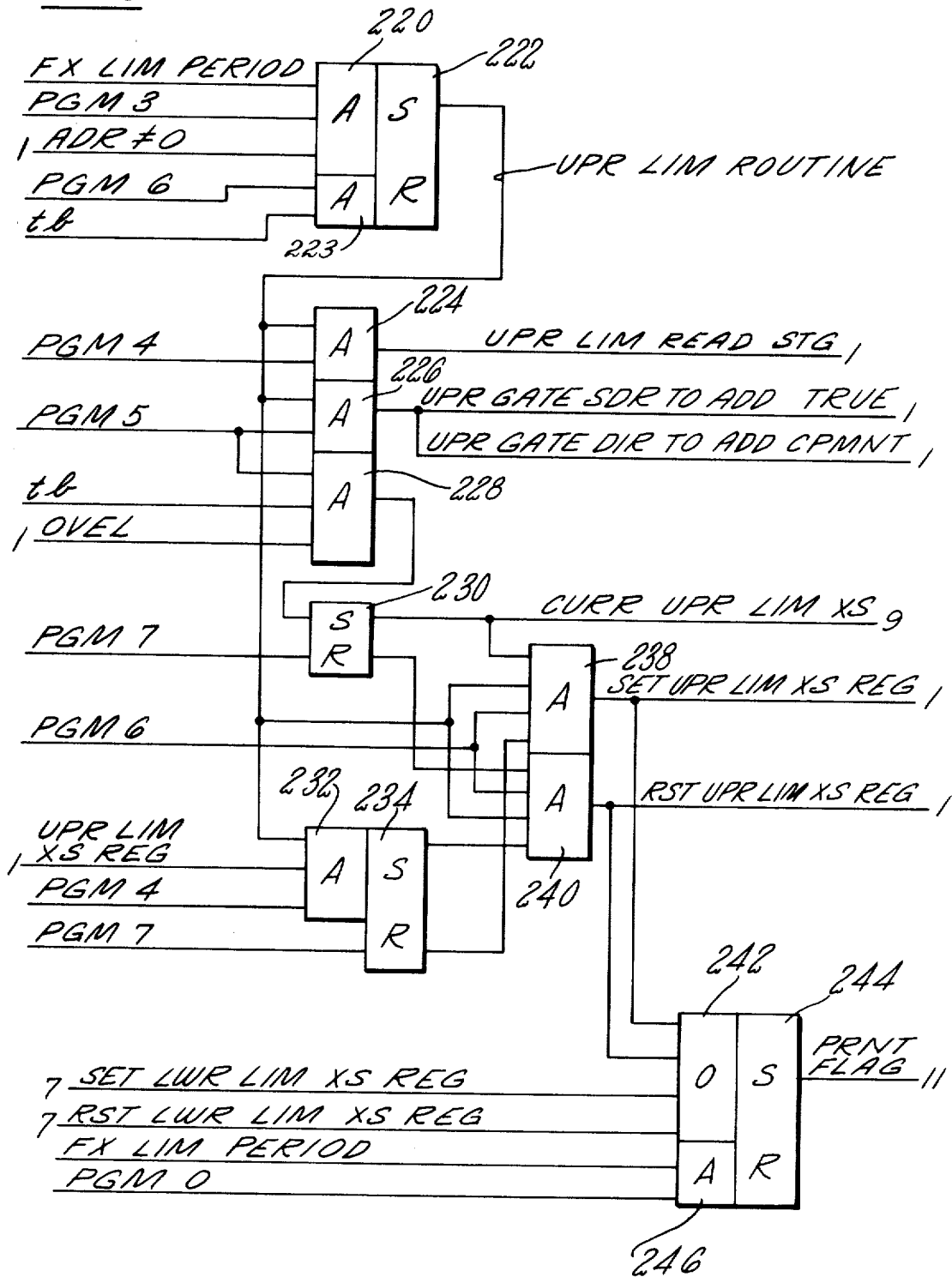
FIG. 8 is a schematic block diagram of control circuitry operative during an upper limit routine of a fixed limit period.
Figure 9:
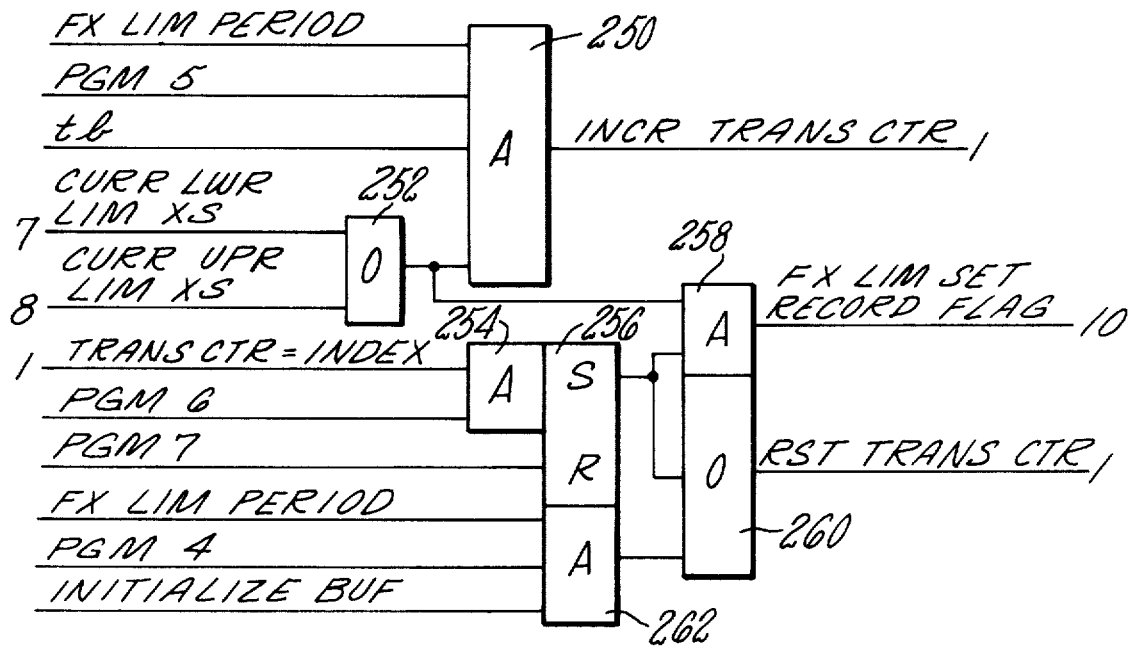
FIG. 9 (sheet 11) is a schematic block diagram of control circuitry operative during the end of a fixed limit period.

The fixed limit period includes a possible lower limit routine (FIG. 7), a possible upper limit routine (FIG. 8), and transient and other functions (FIG. 9).

Figure 7:
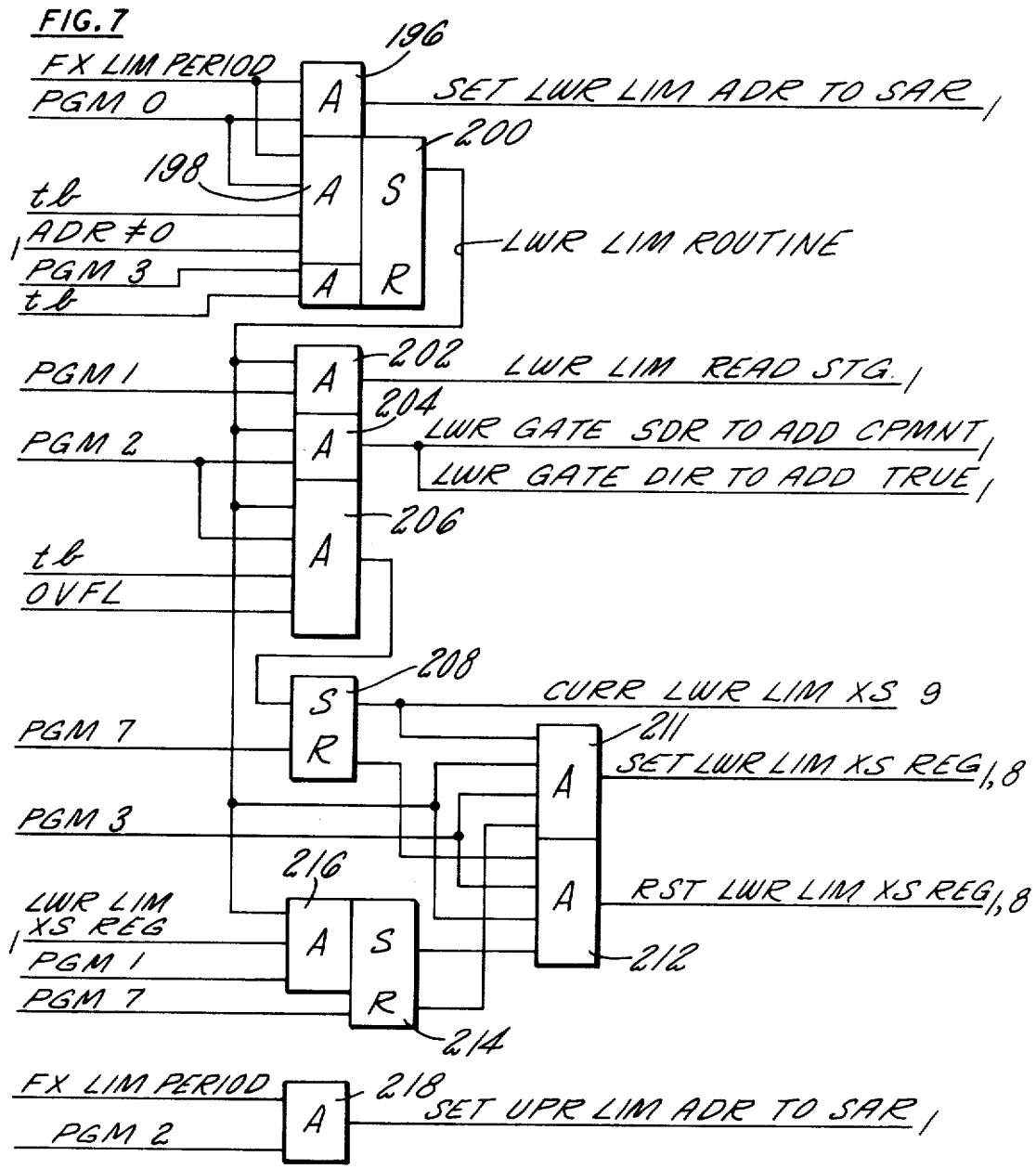
FIG. 7 is a schematic block diagram control circuitry operative during the lower limit routine of a fixed limit period.

Referring now to FIG. 7, during program time zero, an AND circuit 196 generates a signal which will cause the lower limit address 38 of the ROM 32 to be gated into the SAR (FIG. 1). This is a signal that occurs on a SET LWR LIM ADR TO SAR line which connects with the gate of the SAR 30 (FIG. 1). During the second half of program time 0 (due to timing signal tb an AND circuit 198 may operate provided the zero detect 44 (FIG. 1) presents a signal on the ADR ≠ ZERO line. The AND circuit 198 will set a latch 200, the output of which comprises a signal indicating that a lower limit routine is to be performed. On the other hand, if the zero detect 44 (FIG. 1) does not produce a signal indicating that the address stored in SAR 30 is other than zero, then this is an indication that there is no lower limit for the current parameter, and that the lower limit routine need not be entered. The first timing periods of a fixed limit period are defined by the lower limit routine, if the latch 200 is set, and these periods perform no function except the continuing advancement of the program counter if the latch 200 is not set.

During the lower limit routine, in program time 1, an AND circuit 202 will cause a storage read out of the storage location identified by the lower limit address due to a signal on a LWR LIM READ STG line. In program time 2 of a lower limit routine, an AND circuit 204 causes the lower limit to be transferred from the SDR 24 (FIG. 1 where the storage contents are always placed as a result of a read operation) to the minus adder input, and causes the current value to be transferred from the DIR (14, FIG. 1) to the plus input of the adder. Then during the second half of program time 2, an AND circuit 206 will test the overflow out of the adder to see if the current value is in fact lower than the lower limit, which fact will be indicated by a signal on the OVFL line. If the current value is lower than the lower limit, the AND circuit 206 operates, and this sets a current lower limit XS buffer latch 208. With the latch 208 set, a signal on the CURR LWR LIM XS line applied to the circuitry of FIG. 9 (and described hereinafter) may cause setting of the record flag and up-dating of the transient counter 58 (FIG. 1). This signal is also applied to an AND circuit 211, and the complementary output (the reset side) of the latch 208 is applied to an AND circuit 212. Other inputs to the AND circuit 211 include the complementary output of a latch 214 and timing signals to ensure that the AND circuit 211 will operate only during a lower limit routine within program time 3. The latch 214 is set by an AND circuit 216 during program time 1 of a lower limit routine provided that the lower limit excess register 210 (FIG. 1) is set. Thus the latch 214 acts as a buffer latch for the lower limit excess register so that its previous condition can be monitored to determine whether its condition should be changed, without the change itself being reflected in the monitoring. The set side of the latch 214 is applied to the AND circuit 212. Thus, if there was currently a lower limit excess as indicated by latch 208, and there had not previously been a lower limit excess as indicated by the reset side of the latch 214, then the AND circuit 211 will cause the signal to be generated on a SET LWR LIM EXCESS REG line which causes the lower limit excess register 210 (FIG. 1) to become set. On the other hand, if there is no current lower limit excess as indicated by the latch 208 not being set, but there previously was an excess as indicated by latch 214 being set, then the AND circuit 212 will generate a signal on the RST LWR LIM XS REG line to cause the excess register 210 (FIG. 1) to become reset. If the latches are currently both set or both reset nothing happens. That is, if there is no current excess and there was previously none, the excess register remains unchanged. If there is a current excess and there previously has been one, then neither of the AND circuits 211, 212 will operate and the setting of the excess register also remains unchanged. The outputs of the AND circuits 211, 212 are also used to set the printer flag so that whenever a lower limit is first exceeded, or when a value which previously exceeded a lower limit returns to being within limits, AND circuits 211 or 212 will operate and this is the definition in the present embodiment of when the printing is to occur. This is described in more detail with respect to FIG. 8, hereinafter. Notice that both of the latches 208, 214 will remain set until program time 7 and will then be reset and cannot again become set until the occurrence of a following lower limit routine. The lower limit routine latch 200 (top, FIG. 7) is reset during the second half of program time 3, after the circuitry at the bottom of FIG. 7 has had a chance to operate. The latches 208, 214 may remain set in order to participate in record flag and transient consideration even though the lower limit routine latch 200 becomes reset, and the AND circuits 211 and 212 will perform their functions in both FIGS. 1 and 8 during the first half of program time three, so it is immaterial that they become blocked during the second half of program time 3 as a result of resetting of the lower limit routine latch 200.

Referring to the bottom of FIG. 7, an AND circuit 218 is operative during program time 2 of a fixed limit period to generate a signal to cause the upper limit address output 39 of the ROM 32 (FIG. 1) to be transferred to the SAR 30; this signal is sent on a SET UPR LIM ADR TO SAR line. This is possible since the AND circuit 202 (top FIG. 7) causes storage to be read in response to the lower limit address during program time 1, so that the storage address register can be updated to contain the upper limit address during program time 2, thus being available for testing for an all zeros condition during program time 3, as illustrated at the top of FIG. 8.

In FIG. 8 during program time three of a fixed limit period, an AND circuit 220 will set an upper limit routine latch 222 provided that the zero detect 44 (FIG. 1) indicates that the address set in the SAR 30 (the upper limit address at this time) is not zero. If the address is zero, then it indicates that this particular parameter has no upper limit to be tested. With the latch 222 set, indicating an upper limit routine is to be performed, an AND circuit 224 operates during program time 4 to cause reading of storage for the purpose of obtaining an upper limit value. This signal appears on the UPR LIM REAP STG line. Reading of the storage, as usual, provides the upper limit within the SDR 24 (FIG. 1) during program time 4. At program time 5, an AND circuit 226 causes the upper limit in the SDR 24 to be transferred to the positive or TRUE input of the adder 18 (FIG. 1), and causes the current parameter value in the DIR 14 to be transferred to the negative or CPMNT (complement) input to the adder 18. Thus, if the upper limit is in fact of a higher value than the current parameter value, a natural subtraction will be performed and no overflow will be sent on the OVFL line. If no overflow occurs, there are no further functions in the upper limit routine portion of the fixed limit period (that is, the functions relating to FIG. 8). On the other hand, in the event that the upper limit is a lower value than the current value, then there will be an overflow from the adder 18 (FIG. 1) causing an AND circuit 228 (center, FIG. 8) to operate and perform functions which are identical to the functions related to the lower portion of FIG. 7 in the lower limit routine. Specifically, the current upper limit excess is stored in a latch 230, an AND circuit 232 has previously set an upper limit excess buffer latch 234 provided the upper limit excess register 236 (FIG. 1; a portion of the fixed limit control register 28) was set. Then a pair of AND circuits 238, 240 will cause setting of the upper limit excess register if there is a current upper limit excess and the latch 234 indicates that there was not a prior upper limit excess, or an AND circuit 240 will cause resetting of the upper limit excess register if the latch 234 indicates it was previously set and there is no current upper limit excess, as indicated by the reset condition of the latch 230. In addition, the outputs of the AND circuits 238 and 240, together with the outputs of the AND circuits 211 and 212 (FIG. 7) are passed to an OR circuit 242 which will set a latch 244 if a signal appears on any of these four input lines. The latch 244 comprises the printer flag latch and signifies the fact that the current parameter has first gone into an excess condition or has just come out of an excess condition and therefore this event (in either case) is to cause printing of the parameter number, the time, and whether an upper or lower excess currently exists, in accordance with the printer routine described hereinafter. The printer flag latch 244 will remain set until the start of the following fixed limit period, as a result of an AND circuit 246. The latch 222 is reset in the second half of each program time 6 by an AND circuit 223.

During the remaining time of a fixed limit period, as indicated on FIG. 9, functions relating to the record flag and the transient counter are performed and the contents of the parameter history register 28 (FIG. 1) may be set in the DIR 14 in order to accompany the current value into the current value storage location in the storage 20. This being so, the upper limit routine latch 222, top of FIG. 8 is reset during the second half of program time 6, the relationship being similar with respect to the bottom of FIG. 8 as are the relationships between the lower limit routine latch and the bottom of FIG. 7.

In FIG. 9, an AND circuit 250 will cause the incrementing of the transient counter during the second half of program time 5 of a fixed limit period provided there is a signal from an OR circuit 252. The OR circuit 252 responds whenever there is an exceeding of upper or lower limits by the current parameter value. Thereafter, during program time 6, an AND circuit 254 will test whether or not the current setting of the transient counter (after the incrementing caused by the AND circuit 250 in the program time 5) is equal to the transient index output 54 of the ROM 32 (FIG. 1) for the current parameter, as is determined by the transient compare circuit 56 (FIG. 1) which will, when the index equals the transient counter, generate a signal on the TRANS CTR = INDEX line. When the AND circuit 254 operates, it causes the setting of a latch 256, the output of which is an indication that the record flag should be set because this parameter has exceeded the number of fixed limits allowed for transient consideration. Thus, when the transient counter equals the index counter in a fixed limit period wherein either the upper or lower excess has been exceeded, an AND circuit 258 will cause setting of the record flag (FIG. 10, as described hereinafter) by providing a signal on a FX LIM SET RECORD FLAG line. The latch 256 will also pass a signal through an OR circuit 260 which resets the transient counter, so that any further exceeding of limits by this parameter and subsequent cycles will begin making a transient count ab initio. The OR circuit 260 is also responsive to an AND circuit 262 which causes the transient counter for all parameters to be reset during the initial scan after power is turned off and then resumed. The AND circuit 262 is responsive in program time 4 of a fixed limit period, when the initialized buffer is set, which is throughout the initial scanning after the initialize signal (scan zero) and is reset at the start of scan one (the second scan). Thus, each time power is restored, during the first scan, all transient counters are reset to zero so that the counting of transients begin anew. Notice that the transient counter is reset each time that it matches the transient index, thus allowing the transient indexes for the various parameters to differ, while still using the same transient counter hardware 58 (FIG. 1) within the parameter history register 28.

At the end of the fixed limit period, during program time 7, the latch 256 in FIG. 9, as well as latches 230 and 234 in FIG. 8 and latches 208 and 214 in FIG. 7 are all reset. This can be done because of the fact that the transient count and flag considerations are all complete at this time and both printer and recorder functions have all been taken care of by this time so the need to buffer this information has been satisfied.

END OF PARAMETER PERIOD - FIGS. 10–12

After program time 7 of the fixed limit period, the next period is program time 0 of the end of parameter (EOP) period (FIG. 10). At this time, there is a possibility of setting a latch 264 in response to an OR circuit 266 from signals generated by either one of two AND circuits 268, 270. The latch 264 comprises the record flag buffer; the output of the latch 264 comprises a signal on the RECORD FLAG BUF line which indicates that some time during the current scanning of parameters, at least one parameter was out of fixed or floating limits, and therefore the entire scan should be printed. When a signal appears on the SLO line (generated by the mode decode circuit 16, FIG. 1) an AND circuit 272 is blocked so that the fixed or floating limit apparatus (FIGS. 6 and 9) cannot set the record flag buffer latch 264. During SLO mode, the only way in which the record flag can be set is once for a complete frame of scans, which is defined herein as when the scan counter is set to its maximum number and therefore all the bit positions thereof are equal to binary one. This results in the scan counter (114, FIG. 4) generating a signal on the SCAN ALL ONES line so that, during program time zero of the EOP period, the record flag buffer latch 264 is set by AND circuit 270. This will happen even when not in slow mode, thus ensuring that, even though no limits are exceeded, at least one scan is recorded for an entire frame of scans. The AND circuit 268, on the other hand, will cause the record flag buffer latch 264 to be set at least once in every scan so that each scan is recorded during fast mode. In fact, the AND circuit 268 will operate during every parameter when there is a signal present on the FAST line which is generated by the mode decode circuit 116, FIG. 1. At the start of each scan, the record flag buffer latch setting is transferred to a record flag latch 273 by a related pair of AND circuits 273a, 273b. The output of the record flag latch 273 is utilized during the start period of each parameter in a subsequent scan (see FIG. 5) since once set, it will remain set until the parameter counter again equals zero and will be reset during program time 4 of the start period during the scanning of the very first parameter in a scan polling.

Also during program time zero of the EOP period, an AND circuit 276 generates signals to again place the current value address output 41 of the ROM 32 (FIG. 1) in the SAR 30, and to transfer the contents of the parameter history register 28 to the DIR 14 (FIG. 1) so that the transient counter, and floating, upper and lower excess registers for this parameter can be placed in storage with the current value of the parameter for use in subsequent scans, and for recording to show which parameters had what excesses. Thus, the AND circuit 276 generates signals on the EOP SET CURR VAL ADR TO SAR line and the SET FX CTRL IN DIR line. Then, in the second half of program time 0 of the EOP period, an AND circuit 278 causes the current value together with the contents of the fixed control register to be put in storage by generating a signal on an EOP WRITE STG line.

At this point, all of the functions of handling the given parameters during this scan have been completed, and the current value together with the contents of the fized control register to be put in storage by generating a signal on an EOP WRITE STG line.

At this point, all of the functions of handling the given parameters during this scan have been completed, and the current value and its history put in storage. The remainder of the program is devoted to a printer input routine and a printer output routine, which of course could be modified in any case where the particular printer being used has its own buffer storage capability.

A printer in routine is defined herein as placing in storage information necessary to permit the printer to record the fact that a parameter has just gone out of limits or has just come back into limits. This routine is started during the first half of program time 0 of the EOP period by an AND circuit 280 (top, FIG. 11) generating signals to cause the printer in counters and printer out counters to be connected to the plus and minus inputs to the adder 18 (FIG. 1). Then, during the second half of program time zero, an AND circuit 282 will sample the overflow from the adder 18, and if there is an overflow, will operate an OR circuit 284 so as to set a latch 286, the output of which comprises a signal on a PRNT IN ≠ PRNT OUT line. If there is no overflow, it does not mean that the two signals are equal, since it may mean that the printer in counter is at a higher value than the printer out counter. Thus, the AND circuit 282 recognizes the case where the printer in counter is a lower value than the printer out counter. On the other hand, during the first half of program time one of the EOP period, an AND circuit 288 will cause the printer in and printer out counters to be reserve1y connected to the adder 18 so that the printer in counter is set to the negative input and the printer out counter is set to the positive input of the adder. During the second half of program time 1, an AND circuit 290 will sample the overflow of the adder so as to determine the case when the printer in counter is higher than the printer out counter. The AND circuit 290 similarly causes the OR circuit 284 to set the latch 286. Thus, by sampling both cases of one of the counters being greater than the other, unless the two counters are equal, the latch 286 will be set by at least the second half of program time 1. This latch will remain set all the way through program time 0 of the next period (which in this case will be the start period of the following parameter) due to the action of an AND circuit 292. If the printer in counter does not equal the printer out counter, then the buffer storage input address (the address where printer information is to be stored in this cycle) has not caught up with the buffer storage output address (the addresses from which data is taken from the storage for printing it by the printer). This allows the printer in counter and printer out counter to be closed-end counters, with or without using a base address, as is known in the art, so as to completely roll through successive storage locations causing new information to be stored at successively higher addresses, and retrieving information from lower ones of successively higher addresses. However, when the printer in counter equals the printer out counter, then it is known that either all the storage locations are full or all of the storage locations are empty. As far as the printer in routine is concerned, the presence of a signal on the PRNT IN ≠ PRNT OUT line from the latch 286 will enable an AND circuit 294 to operate provided there is a signal on the PRNT FLAG line during program time 2. This can only be a program time 2 when the latch 286 can be set, since it is dependent upon the output therefrom. When the AND circuit 294 operates, it will set a latch 296, the output of which enables three different AND circuits 298, 299 and 300. These circuits provide the various signals necessary to complete the printer in routine. Thus, the AND circuit 298 will generate, during the first half of program time two signals to load the DIR with printer information (parameter number, time and fixed limit excesses) and to load the SAR with the current printer input address; these signals appear on the GATE PARAM, G.M.T. & XS TO DIR and GATE PRNT IN TO SAR lines. Next, in the second half of program time 2, the AND circuit 299 causes a storage write operation, which will place the contents of the DIR 14 (FIG. 1) into storage 20, by generating signal on the PRNT WRITE STG line. At the first half of program time 3, the AND circuit 300 causes the printer in counter to be incremented so that during the next cycle where printer information is to be utilized, the next higher address in the printer buffer storage portion of the storage 20 will be specified by the printer in counter. This is caused by a signal on the INCR PRNT IN CTR line. Note that the fact that this printer in counter is incremented at this time will not effect the decision as to whether the printer input equals printer output address, as far as a printer output routine is concerned: the latch 286 will not respond to the new setting of the printer input counter since it tests the relative values of the input and output counters only during program times 0 and 1, and the AND circuit 300 causes incrementing of the printer in counter only at program time 3. Thus, the printer in counter can now be rolled to the same value as the printer out counter, meaning that the buffer is full, but the printer out counter can continue to work by recognizing the previous setting of the latch 286 so that it can remove one printer word from the printer buffer in storage 20, then become incremented, so that it can follow ahead with the buffer being full and the output counter being one count behind the input counter as long as is necessary, with no conflict.

Figure 12:
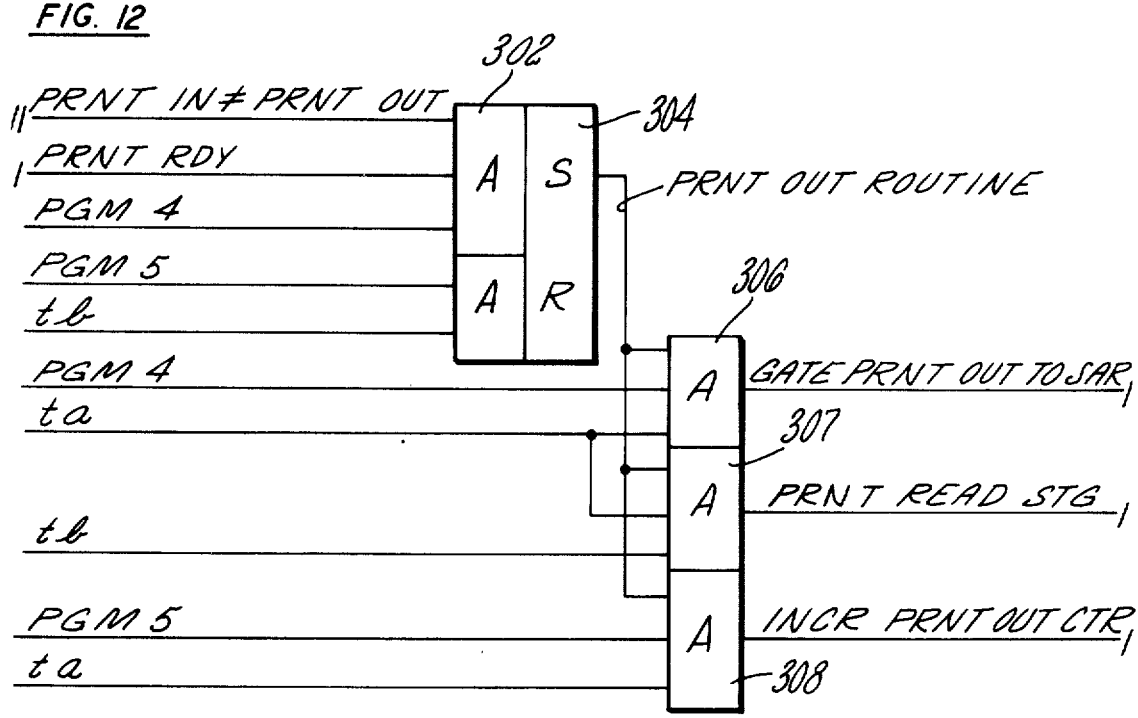
FIG. 12 is a schematic block diagram of a printer buffer output routine during an end of parameter period.

The printer out routine, as illustrated in FIG. 12, begins in program time four, provided that a signal on a PRNT RDY line indicates that the printer is capable of having an output routine at this time and utilizing the data from the printer buffer in storage 20. Provided these conditions are met, an AND circuit 302 will cause the setting of the latch 304, the output of which comprises a signal on the PRNT OUT ROUTINE line. This enables any one of three AND circuits 306, 307 and 308 which perform functions analogous to the function of the AND circuits 298, 299 and 300 in the printer in routine. The difference is that no loading of the DIR 14 has to take place, since the storage is merely being read to the printer. Thus, AND circuit 306 will provide a signal on a GATE PRNT OUT TO SAR line during the first half of program time 4, following which AND circuit 307 will cause a signal on a PRNT READ STG line. Thereafter, in the first half of program time 5, an AND circuit 308 will cause the printer out counter to be incremented by developing a signal on an INCR PRNT OUT CTR line.

The embodiment described illustrates a variety of selective data transmission capabilities. For instance, various modes (FAST, SLO, FL-1, AND FL-2) are provided. Different limits are provided in the two different adaptive modes; thus, the mode of operation can determine the criteria against which tests will be made. For simplicity, additional modes have not been shown, but it is obvious that additional sets of upper and lower fixed limits, and even additional sets of transient indexes could be provided depending upon modes. Similarly, the present embodiment illustrates that modes may be either data or criteria dependent, or may only be time dependent. Thus, in the SLO mode herein, the data is recorded once for every given number of scans, and not in between, even though there may have been limits exceeded as processing proceeds. Similarly, in the fast mode, each scan is recorded even though no limits are exceeded. When in either of the two selective data modes (FL-1, FL-2) as illustrated herein, recording will take place once for a given number of scans in addition to the recording which occurs as a result of analysis of the data being polled against the criteria established therefore.

Also, the invention permits ignoring a criterion analysis in the event that a criterion manifestation, such as a limit or a limit address, is of a given kind (all zeros, herein).

Another facet illustrated by the present embodiment is the difference between certain kinds of criteria analysis and other kinds of criteria analysis. For instance, recording in the present embodiment is performed in response to exceeding either fixed or floating limits. On the other hand, printing is in response only to the fixed limits. Similarly, the present embodiment illustrates different types of data transmissions which may result: the actual value is transmitted to the recorder (along with a flag bit) in any case where the record flag is set, whereas identification of the parameter and other information (the embodiment herein including Greenwich Mean Time and the fact of the excess occurring) are sent to the printer in response to fixed limits Furthermore, the response to the system in dependence upon operating mode and criteria may cause different types of transmission response: the recorder may record whenever the record flag is set; the printer, on the other hand, prints only when the first occurrence of exceeding a fixed limit occurs, and again prints when the parameter value again returns to being within limits, ignoring all excesses in between.

The present embodiment also illustrates that response of the system can be limited in dependence upon its history: thus, in the present embodiment, fixed limits are not recognized for recording purposes until the excess has occurred a number of times indicated by a transient index for the given parameter. This permits ignoring noise from bad sources, while at the same time causing rapid response to critical sources or quiet sources.

The present embodiment has been developed generally, without utilizing nomenclature particularly relating to any given utilization of the present invention. However, as described briefly hereinbefore, one utilization of the present invention, for which it is well suited, is in the recording of flight and aircraft information aboard an aircraft (such as a commercial airliner).

Typical examples of parameters utilized in such a system include engine performance parameters such as engine pressure ratio, rotary speed of one or more compressor stages of each engine, engine exhaust gas temperature, the weight flow, rate of fuel to the engines, and the throttle position. These parameters are most likely to be analog parameters, and to involve both fixed and floating limits.

Engine maintenance parameters may include a vibration factor, oil pressure, oil temperature, quantity of oil in the engine, oil filter pressure and fuel pressure, all of which may also be analog parameters and may likely be tested only against fixed limits since these conditions do not normally reflect performance so much as maintenance, and are not too useful in describing engine degradation, flight profile or operation habits of the pilot, and so forth. Another class of parameter are discrete parameters. One such is engine oil chip detection, which either appears or doesn't, and therefore is not tested against limits. At least once every 128 (or other number) of scans, the presence or absence of a flag relating to chip detection in the oil will be recorded simply because of the manner in which the record flag is set whenever the scan counter is set to its highest number (which is all ones in this embodiment).

Other information, relating to the atmosphere, may include altitude, ram air temperature, and air speed; these are all analog parameters and are most likely tested against both fixed and floating limits. Flight parameters may include the altitude of the aircraft, including roll angle, pitch angle, heading, vertical acceleration and horizontal acceleration are all analog parameters which are useful in determining flight profile and would most likely be tested against both fixed and floating limits.

There is a class of parameters relating to systems on the aircraft which may include cabin pressure, cabin altitude, auxiliary power unit parameters, the positions of flaps, slats and aircraft trim mechanisms, the operativeness of communication and navigation systems, the position of the landing gear, use of reverse thrust and brakes, and the actual time of the day (such as Greenwich Mean Time as described hereinbefore, which can become a regular parameter in any utilization of the present invention if desirable).

Additionally, one of the stations polled, which would most likely be a digital station, could be a pilot entry station wherein the pilot, through a keyboard or otherwise, could enter certain information into the record such as flight number, date, aircraft weight, and aircraft identification.

These parameters are exemplary only, and are intended to illustrate the manner in which the present invention may be utilized in an exemplary environment.

In the exemplary environment of aircraft data recording, the present invention may utilize the various modes, which may comprise the four modes used for illustrative purposes herein, as follows. When the aircraft starts, that is, as the engines are starting up and all systems are stabilizing, as well as during take-off and landing, the FAST mode may be utilized so as to record once per scan whether or not there are any limits exceeded. During the time that the aircraft has become fully operational but is standing idle, and while it is taxiing, both before and after take-off, the SLO scan may be utilized to record only once per hundred scans no matter what the limit conditions may be. Then, climb and descent may be one of the floating limit modes, and cruise may comprise the other floating limit mode. This provides the opportunity to have different limits during climb and descent than in cruise where the limits could vary more before taking note of the exceeding of any floating limit, leaving the fixed limits to relate mostly to dangerous or urgent conditions. Of course, the modes defined herein as FL-1 and FL-2 could be given other nomenclature and include differences in the lower and upper fixed limits as well. This has been eliminated from this embodiment since it is obvious that the mode decode circuitry could select between pairs of upper and lower limit addresses and perform the same operations, in a fashion similar to the way in which the floating limit deviation is selected in response to the mode decode.

The present embodiment has been disclosed in a simple fashion in order to more clearly present the invention. Thus, a basic parameter and program counter system together with the read only memory are the basic means of controlling the present invention. It should be obvious, however, that variations may be made therein without departing from the invention. For instance, the floating limits could be stored in particular locations in main storage, and the read only memory output relating thereto could comprise addresses as in the case of the fixed limits herein. Similarly, all of the parameters provided by the read only memory could be provided through addressing or indirect addressing if desirable, utilizing more and more general storage and more and more timing routines in order to reach the values in storage. In fact, it is possible to use relatively little hardware, a main storage, and a small, programmable computer for accessing all of the values desired for any given parameter and performing the various functions necessary; along this line, all of the functions performed by the adder herein, as well as transient counter up-dating and even setting and resetting of limit registers could be performed by suitable programming in a storage-oriented computer. The mode decode circuitry printer input and output counters and other functions could also be performed by a suitable computer working with a storage apparatus. It should be emphasized that the present embodiment reflects a particular implementation which is readily understood in terms of the functions to be performed and the timing relationships involved.

The present embodiment transmits data to a recorder and to a printer, shown as being hard-wired herein. Of course, the principle is the same in a utilization wherein telemetric or other wireless transmission is involved.

Thus, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. (One excess, record all) In electronic data processing apparatus for the selective recordation of data in response to at least one of a set of criteria; said set of criteria including testing of the data against fixed limits, testing of the data against floating limits, and intervals of time; said apparatus including data processing and recording means and connected to a plurality of data sources; the method of selective recordation of data from said sources comprising the steps of:
   receiving in sequence successive ones of a series of data value manifestations from respective ones of a group of said data sources;
   providing data value limits for the testing of the data value manifestations from a plurality of data sources in said group, said data value limits relating to the values represented by said data;
   testing successive ones of said data value manifestations against related ones of said data value limits and generating at least a first indication in response to at least one of said data values falling outside at least one of said data value limits; and
   selectively transmitting to said recording means, in response to the generation of said first indication, said data value manifestations relating to said group of data sources.

2. (Record all, Print one) The method according to claim 1 wherein said data processing apparatus includes printing means, and additionally comprising the step of:
   selectively transmitting to said printing means the one of said data value manifestations resulting in the generation of said first indication.

3. (Record FL, Print FX) The method according to claim 1 wherein:
   said data processing apparatus includes printing means;
   said providing step comprises providing data value limits of two kinds;
   said testing step comprises testing each of said data value manifestations against the related data value limits of any of said kinds established therefore and generating at least said first indication in response to at least one of said data value manifestations falling outside at least one of said data value limits of at least a first one of said kinds, and generating a second indication in response to one of said data value manifestations falling outside at least one of said data value limits of a second one of said two kinds; and
   additionally comprising the step of transmitting to said printing means the data value manifestations from only ones of said sources resulting in generating said second indication as a result of testing against the related criteria.

4. (FX, FL Per Se) The method according to claim 3 wherein said providing step comprises:
   providing for each of a number of said group of data sources, a data value manifestation previously received from the respective data source and a deviation value to establish floating limits for said number of sources, and providing fixed limits for some of said group of data sources, said first and second kinds of data value limits comprising said floating and fixed limits, respectively.

5. (Record FL and FX, Print FX) The method according to claim 3 wherein said testing step comprises generating at least said first indication in response to at least one of said data value manifestations falling outside at least one of said data value limits of either of said kinds.

6. (Print on XS and Return) The method according to claim 5 wherein:
   said receiving step comprises receiving in a cyclically repetitive sequence successive ones of a series of said data value manifestations; and further comprising the step of:
   registering for each of said data sources, the testing of the data value manifestation of which causes the generation of said second indication, a history manifestation of said second indication; and wherein
   said testing step additionally comprises generating said second indication for a given one of said data value manifestations in response to the presence of a related one of said history manifestations and the failure of the related testing step to result in the generation of said first indication.

7. (Identify XS source) The method according to claim 1 wherein said transmitting step comprises selectively transmitting in response to the generation of said first indication, ones of said data value manifestations which resulted in the generation of said first indication together with a manifestation of said first indication, whereby each one of data value manifestations resulting in the generation of said first indication is specifically identified.

8. (Plural Modes) In electronic data processing apparatus for the selective recordation of data in response to at least one of a set of criteria; said set of criteria including testing of the data against fixed limits, testing of the data against floating limits, and intervals of time; said apparatus including data processing and recording means and connected to a plurality of data sources; said apparatus capable of operation in at least two selectable data recordation modes; the method of selective recordation of data from said sources comprising the steps of:
   establishing a selected one of a plurality of operating modes;
   receiving in a cyclically repeating sequence successive ones of a series of data value manifestations from respective ones of a group of said data sources;
   generating a first indication that data is to be recorded - in response to the establishment of a first one of said modes, by providing data value limits for the testing of the data value manifestations from a plurality of data sources in said group, said data value limits relating to the values represented by said data value manifestations, testing successive ones of said data value manifestations against related ones of said data value limits, and generating at least said first indication in response to at least one of said data values falling outside at least one of said data value limits; or in response to the establishment of a second one of said modes, by generating said first indication once for a given number of said sequences of receiving data value manifestations, alternatively; and selectively transmitting to said recording means, in response to the generation of said first indication, said data value manifestations relating to said group of data sources.

9. (Fast Mode) The method according to claim 8 wherein said given number of said sequences comprises one sequence.

10. (Slow Mode) The method according to claim 9 wherein:

said apparatus is capable of operating in at least three data recordation modes; and said generating step comprises generating said first indication - in response to the establishment of a third one of said modes, by generating said first indication once for a given plurality of said poling sequences.

11. (Slow Mode) The method according to claim 8 wherein said given number of said sequences comprises a plurality of sequences.

12. (Second Test Mode) The method according to claim 8 wherein:

said apparatus is capable of operating in at least three data recordation modes; and said generating step comprises - in response to the establishment of an additional one of said modes, providing second data value limits for the testing of the data value manifestations from said plurality of data sources, said second data value limits being similar to, corresponding with, but of different values than the data value limits of said first mode, testing successive ones of said data value manifestations against related ones of said second data value limits, and generating at least said first indication in response to at least one of said data values falling outside at least one of said second data value limits.

13. (Mode set by data) The method according to claim 8 wherein said establishing step comprises:

establishing a selected one of said operating modes in dependence upon the values represented by the data value manifestations from at least one of said sources.

14. (Record all, Print one) The method according to claim 9 wherein said data processing apparatus includes printing means, and additionally comprising the step of:

in response to the establishment of said first mode, selectively transmitting to said printing means the one of said data value manifestations resulting in the generation of said first indication.

15. (Plural Test Modes) In electronic data processing apparatus for the selective recordation of data in response to at least one of a set of criteria; said set of criteria including testing of the data against fixed limits, testing of the data against floating limits, and intervals of time; said apparatus including data processing and recording means and connected to a plurality of data sources; said apparatus capable of operation in a plurality of selective data recordation modes; the method of selective recordation of data from said sources comprising the steps of:

establishing a selected one of a plurality of operation modes;

receiving in sequence ones of a series of data value manifestations from respective ones of a group of said data sources;

generating a first indication that data is to be recorded by providing a set of test criteria for each of said modes, said criteria differing for different ones of said modes, there being in each mode at least one of said criteria for the testing of data value manifestations from a number of said data sources in said group thereof, and testing each successive one of said data values against the related one of said criteria provided for the established operating mode, and generating at least a first indication that at least one of said data values fails to meet a related one of said test criteria; and selectively transmitting to said recording means, in response to the generation of said first indication, at least the one of said data value manifestations the testing of which against the related one of said criteria resulted in the generation of said first indication.

16. (Fast Mode) The method according to claim 15 wherein:

said providing and testing sub-steps are performed in response to establishing one of a pair of first operating modes;

said receiving step comprises receiving in a cyclically repetitive sequence ones of a series of said data value manifestations; and said generating step comprises, in response to the establishment of a third one of said modes, generating said first indication once for each of said poling sequences.

17. (Mode set by data) The method according to claim 15 wherein said establishing step comprises:

establishing a selected one of said operating modes in dependence upon the values represented by the data value manifestations from at least one of said sources.

18. (One excess, Record all) The method according to claim 15 wherein said transmitting step comprises:

selectively transmitting to said recording means, in response to the generation of said first indication, said data value manifestations relating to all of said group of data sources.

* * * * *